US012799394B2

(12) United States Patent
Kishore Kumar et al.

(10) Patent No.: US 12,799,394 B2
(45) Date of Patent: Nov. 17, 2026

(54) QUASI-ONE-DIMENSIONAL GRAPHENE NANOMATERIALS FOR NANOSCALE TUNABLE COHERENT LIGHT EMISSION

(71) Applicant: California Institute of Technology, Pasadena, CA (US)

(72) Inventors: Deepan Kishore Kumar, Pasadena, CA (US); Nai-Chang Yeh, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 1092 days.

(21) Appl. No.: 17/950,421

(22) Filed: Sep. 22, 2022

(65) Prior Publication Data

US 2023/0089278 A1 Mar. 23, 2023

Related U.S. Application Data

(60) Provisional application No. 63/286,869, filed on Dec. 7, 2021, provisional application No. 63/246,869, filed on Sep. 22, 2021.

(51) Int. Cl.

| | |
|---|---|
| ***C09K 11/65*** | (2006.01) |
| ***B82Y 15/00*** | (2011.01) |
| ***B82Y 30/00*** | (2011.01) |
| ***C01B 32/19*** | (2017.01) |

(52) U.S. Cl.

CPC .............. *C09K 11/65* (2013.01); *C01B 32/19* (2017.08); *B82Y 15/00* (2013.01); *B82Y 30/00* (2013.01); *C01B 2204/02* (2013.01)

(58) Field of Classification Search

CPC ..... C09K 11/65; C01B 32/19; C01B 2204/02; B82Y 15/00; B82Y 30/00

USPC .................................................. 252/301.4 R

See application file for complete search history.

(56) References Cited

U.S. PATENT DOCUMENTS

2013/0181166 A1* 7/2013 Tetsuka .................. C09K 11/65 252/301.36
2013/0330523 A1* 12/2013 Zhang ................... C01B 32/186 977/734
2016/0207776 A1* 7/2016 Hintermann ....... H10D 62/8303
2020/0013991 A1* 1/2020 Wang ..................... G01K 11/00

* cited by examiner

*Primary Examiner* — Anita Nassiri-Motlagh
(74) *Attorney, Agent, or Firm* — Kilpatrick Townsend & Stockton LLP

(57) ABSTRACT

Described are devices, such as light emitters, lasers, and switches, and methods, such as methods of generating photoluminescence and methods of fabricating electronic devices. Example devices and methods described include those comprising or employing optically active graphene, such as in the form of one or more layers of quasi-1D graphene nanomaterials or graphene nanostripes including one or more topological defects. Optically active graphene can emit photoluminescence upon exposure to photoexcitation and can also generate laser emission, optionally as a frequency comb. The optically active graphene can be patterned onto substrates according to the disclosed methods of fabricating electronic devices and is optionally useful for generating optical switches.

12 Claims, 40 Drawing Sheets

PG

Stone-Wales defect

PG

Stone-Wales defect

Single vacancy

Double vacancy

QUASI-ONE-DIMENSIONAL GRAPHENE NANOMATERIALS FOR NANOSCALE TUNABLE COHERENT LIGHT EMISSION

CROSS-REFERENCES TO RELATED APPLICATIONS

This application claims benefit under 35 USC§ 119(e) to U.S. Provisional Patent Application No. 63/246,869 filed Sep. 22, 2021 entitled "Graphene-on-Silicon Photonic Hybrid Optical Interconnects," and to U.S. Provisional Patent Application No. 63/286,869 filed Dec. 7, 2021 entitled "Quasi-One-Dimensional Graphene For Nanoscale Tunable Coherent Light Emission," the disclosures of which are hereby incorporated by reference in their entirety for all purposes.

STATEMENT AS TO RIGHTS TO INVENTIONS MADE UNDER FEDERALLY SPONSORED RESEARCH AND DEVELOPMENT

This invention was made with government support under Grant No. W911NF-16-1-0472 awarded by the Army and under Grant No. PHY1733907 awarded by the National Science Foundation. The government has certain rights in the invention.

BACKGROUND OF THE INVENTION

Optical fibers, micro-scale waveguide couplers, and other passive photonic components play a major role in the global communication network from data centers to biosensors by guiding optical waves from source to destination or allowing for measurable changes in intensity or phase of light for biosensing. The lack of silicon compatible light sources has been a major challenge for integrated optoelectronic applications. Light sources on silicon are currently chip-bonded III/V active media, or Ge based non-scalable epitaxial integration.

SUMMARY OF THE INVENTION

In various aspects, provided herein are devices and methods. In some examples, the disclosed devices include light emitters, lasers, and switches. In some examples, the disclosed methods include methods of generating photoluminescence and methods of fabricating electronic devices. In embodiments, the devices and methods described include those comprising or employing optically active graphene, such as in the form of graphene nanowalls or nanostripes including topological defects. The disclosed optically active quasi-one-dimensional (quasi-1D) graphene nanomaterials can emit photoluminescence upon exposure to suitable photoexcitation and can also generate laser emission, optionally as a frequency comb, in some examples. The disclosed optically active graphene can be patterned onto substrates according to the disclosed methods of fabricating electronic devices and is optionally useful for generating optical switches.

In a first aspect, light emitters are described. An example light emitter of this aspect comprises a substrate and a quasi-1D graphene nanomaterial coupled to the substrate. The quasi-1D graphene nanomaterial may include one or more topological defects, such as one or more topological defects that are induced in the quasi-1D graphene nanomaterial during growth or one or more topological defects that are generated after growth of the quasi-1D graphene nanomaterial. The quasi-1D graphene nanomaterial may comprise pristine graphene or doped graphene. The one or more topological defects may include, but are not limited to, Stone-Wales defects, single vacancy defects, double vacancy defects, or the like. The quasi-1D graphene nanomaterial may be characterized by a length, a width, and a thickness of one or more graphene monolayers, wherein a length-to-width ratio is greater than 10:1, such as where the length-to-width ratio is between 10:1 and 130:1. In some examples, the quasi-1D graphene nanomaterial may comprise less than 100 layers of graphene, such as less than 50 layers, less than 20 layers, less than 10 layers, less than 5 layers, or 1 layer.

As described further herein, the presence of the one or more topological defects may impart an optical activity to the quasi-1D graphene nanomaterial, which is surprising and unexpected given that graphene is a semi-metallic material, having no band gap, and is not optically active. In some examples, the quasi-1D graphene nanomaterial is characterized by an emission lifetime on the order of 300 ps to 10 ns. For example, the emission lifetime may be on the order of 1 ns to 10 ns. In some examples, the quasi-1D graphene nanomaterial is characterized by multiple emission lifetimes, where each emission lifetime may be on the order of 300 ps to 10 ns. For example, the quasi-1D graphene nanomaterial may be characterized by a first emission lifetime of about 8 ns to 15 ns, a second emission lifetime of about 1 ns to 3 ns, and a third emission lifetime of from about 300 ps to 1 ns. In some embodiments, the emission lifetime of the quasi-1D graphene is temperature independent.

In another aspect, methods are described, such as methods of generating photoluminescence. An example method of this aspect comprises illuminating a quasi-1D graphene nanomaterial with a light source, such as a quasi-1D graphene nanomaterial that includes one or more topological defects; and producing photoluminescence from the one or more topological defects. In some examples, the quasi-1D graphene nanomaterial may be a light emitter, as described above, or any other quasi-1D graphene nanomaterial described herein, such as a graphene nanostripe. In some examples, the photoluminescence is characterized by an emission lifetime on the order of 300 ps to 10 ns, such as where the emission lifetime is on the order of or from 1 ns to 10 ns. In some embodiments, the emission lifetime of the quasi-1D graphene is temperature independent.

In some examples, methods of this aspect may comprise growing the quasi-1D graphene nanomaterial on a substrate. Optionally, one or more topological defects are introduced into the quasi-1D graphene nanomaterial during growth. Optionally, the one or more topological defects are introduced into the quasi-1D graphene nanomaterial after growth, such as where the quasi-1D graphene nanomaterial is subjected to a process that introduces the one or more topological defects. For example, the quasi-1D graphene nanomaterial may be subjected to an argon/oxygen plasma.

In another aspect, lasers are described. In a specific example, a laser comprises a pump laser and one or more layers of quasi-1D graphene nanomaterials disposed on a substrate and optically coupled to the pump laser, such as where one or more layers of quasi-1D graphene include one or more topological defects. In an example, the one or more layers of quasi-1D graphene nanomaterials comprises graphene nanostripes coupled to the substrate. Optionally, the graphene nanostripe is characterized by a length, a width, and a thickness of one to several monolayers, such as where a length-to-width ratio is greater than 10:1. In some examples, the substrate comprises silicon. Optionally, the pump laser is operable to inject pump light orthogonal to the substrate.

In some examples, the one or more layers of quasi-1D graphene nanomaterials form a resonant cavity of the laser, leading to coherent single-mode and multi-mode light emissions at multiple wavelengths different from that of the pump laser, as well as nonlinear optical processes manifested by periodic, comb-like sharp peaks in the optical emission spectra. Optionally, each of the one or more layers of quasi-1D graphene nanomaterials are disposed in a growth plane and the resonant cavity is orthogonal to the growth plane. In some examples, the resonant cavity is defined by a graphene/air interface and a graphene/substate interface. In some examples, the resonant cavity comprises a one-dimensional cavity including the topological defect. In some examples, each of the one or more layers of quasi-1D graphene nanomaterials are disposed in a growth plane and the pump laser is operable to inject pump light orthogonal to the growth plane. In some examples, the topological defect in the one or more layers of quasi-1D graphene nanomaterials forms a quasi-one-dimensional optical structure and the pump laser is operable to inject pump light into the one or more layers of quasi-1D graphene nanomaterials along a growth direction.

In another aspect, switches are described, such as optical switches or optoelectronic switches. An example switch of this aspect comprises a pulsed light source, a beam splitter optically coupled to the pulsed light source and operable to provide a first optical path and a second optical path, a first quasi-1D graphene structure disposed along the first optical path, such as where the first quasi-1D graphene structure includes one or more topological defects, a delay stage and a second quasi-1D graphene structure disposed along the second optical path, such as where the second quasi-1D graphene structure includes one or more topological defects, a photodetector optically coupled to the first quasi-1D graphene structure and the second quasi-1D graphene structure, and a logic circuit coupled to the photodetector. Optionally, the delay stage comprises one or more moveable mirrors. Optionally, the photodetector comprises a synchronous photodetector.

In some examples, the first and/or second quasi-1D graphene structures may be characterized by an emission lifetime between 300 ps and 10 ns. For example, the emission lifetime may be between 1 ns and 10 ns. In some examples, the second quasi-1D graphene structure is characterized by a second emission lifetime different from the first quasi-1D graphene structure. In some examples, the first and/or second quasi-1D graphene structures are characterized by a first emission lifetime between 1 ns and 2 ns and a second emission lifetime between 8 ns and 10 ns.

In some examples, the first quasi-1D graphene structure and the second quasi-1D graphene structure are regions of a single graphene nanostripe. Optionally the regions are the same or different regions. In examples, the graphene nanostripe is characterized by a length, a width, and a thickness of one to several monolayers, wherein the length-to-width ratio is greater than 10:1.

In another aspect, methods are described, such as methods for fabricating electronic devices. An example method of this aspect comprises providing a substrate, depositing a hardmask layer on the substrate, depositing a photoresist layer on the hardmask, patterning the photoresist layer to form a photoresist layout, patterning the hardmask layer using the photoresist layout to form a patterned hardmask and exposed substrate regions, and depositing a quasi-1D graphene structure on the exposed substrate regions. Optionally, the hardmask layer comprises alumina.

In some examples, depositing the quasi-1D graphene structure comprises a direct growth process, such as where the quasi-1D graphene structures are directly grown on the substrate. Optionally, depositing the quasi-1D graphene structure comprises use of a vacuum assisted coating process, such as a solvent-based vacuum assisted coating process. In examples, the vacuum assisted coating process comprises growing one or more quasi-1D graphene layers, exfoliating the one or more quasi-1D graphene layers from the growth substrates to form exfoliated quasi-1D graphene, forming a solution or suspension including a solvent and the exfoliated quasi-1D graphene, applying the solution or suspension to the exposed substrate regions, and removing the solvent.

In some examples, the solvent is removed by evaporating the solvent. Optionally, removing the solvent comprises placing the substrate in a vacuum chamber, and reducing a pressure of the vacuum chamber to less than 100 mTorr. Optionally, the vacuum chamber is at room temperature. In some examples, the substrate or components inside the vacuum chamber may be heated to a temperature above room temperature, for example, to a temperature of up to 50° C.

In some examples, the quasi-1D graphene structure includes one or more topological defects. Optionally, the one or more quasi-1D graphene layers are grown to include one or more topological defects. Optionally, the one or more defects are created by subjecting the one or more quasi-1D graphene layers to a process that introduces one or more topological defects, such as exposure to an argon/oxygen plasma.

Additional features, benefits, and embodiments are described below in the detailed description, figures, and claims.

DETAILED DESCRIPTION OF THE INVENTION

Figure 1A:
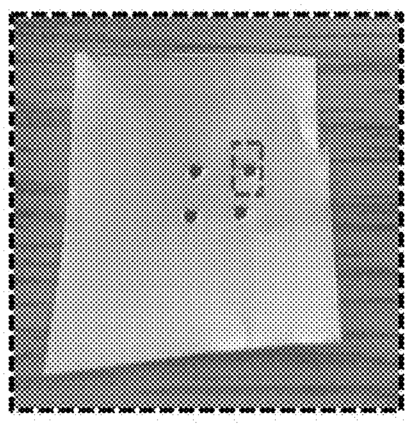
FIG. 1A provides an image of an aluminum foil mask with holes for Ar plasma etching according to some embodiments.

This application describes, among other aspects, a form of graphene that exhibits optical activity, in sharp contrast to conventional graphene (e.g., an infinite sheet of $sp^2$ hybridized carbon), which has no bandgap. Conventional graphene can emit blackbody radiation, and thus can generate broadband emission when heated, but conventional graphene is otherwise known to be not optically active. The disclosed optically active graphene nanomaterials include topological defects, which function as color centers, that open an optical band gap in the otherwise gapless material, allowing absorption of light and generation of photoluminescence.

In some cases, the optically active graphene may be referred to as quasi-one-dimensional or quasi-1D graphene nanomaterial or quasi-1D graphene, in that it may comprise a structure that includes one to several monolayers characterized by a length and a width, such as with a length-to-width ratio greater than 10:1, greater than 50:1, or greater than 100:1. In some examples, a quasi-1D graphene may have a length of up to or about to 1 μm to about 10 μm and a width of about 100 nm to 1 μm. It will be appreciated that the disclosed quasi-1D graphene described herein is different from other graphene, which is sometimes referred to in the art as graphene nanoribbon, based on at least the scale of the lengths and widths of the graphene. Prior graphene nanoribbons are generally smaller by a factor of 10-100 as compared to the quasi-1D graphene described herein. To include optical activity, the quasi-1D graphene may include at least some of a variety of different defects, such as, but not limited to, dopants, structural defects, or topological defects. In some examples, the terms optically active graphene and quasi-1D graphene are used interchangeably herein. In some cases, optically active graphene and quasi-1D graphene may sometimes be referred to herein as graphene nanostripes and it will be understood that graphene nanostripes in the context of the instant disclosure refer to quasi-1D graphene, such as having a length-to-width ratio greater than 10:1, greater than 50:1, or greater than 100:1 and/or a length of up to or about to 1 μm to about 10 μm and a width of about 100 nm to 1 μm. Quasi-1D graphene may comprise one or a plurality of layers of graphene (e.g., less than or about 100, less than or about 50, less than or about 25, or less than or about 10), and the number of layers of graphene may dictate a thickness of the quasi-1D graphene.

In some examples of quasi-1D graphene with topological or structural defects, the graphene material itself may be pristine or very pure (e.g., 100% carbon or almost 100% carbon, such as 99% or more), such as consisting of only carbon, or consisting essentially of carbon bonded to with hydrogen at the edges of the graphene structure and/or with hydrogen at certain defects in the graphene. In examples, the topological or structural defects in the quasi-1D graphene described herein may occur due to the absence of one or more carbon atoms in the graphene matrix or, in some cases, due to the presence of an extra carbon atom. In some examples of quasi-1D graphene with topological or structural defects, the graphene material may not include other atoms (e.g., oxygen) in the bulk besides carbon and, in some cases, hydrogen. In other examples of quasi-1D graphene, however, dopants or impurities may be present in the graphene structure and/or bonded to carbon atoms in the graphene structure (e.g., oxygen atoms).

The topological defects can be imparted in the graphene as it is grown from a surface (e.g., a silicon surface or a copper surface). Plasma enhanced chemical vapor deposition (PECVD) is a technique that is useful for growing quasi-1D graphene, such as in the form of graphene nanostripes extending vertically from the surface (rather than with a plane parallel to the surface), and topological defects can be included in the graphene in certain cases. For example, by controlling the plasma power, precursor identity, growth rate, number of nucleation sites, total pressure, flow rates and/or concentration of precursor(s), plasma gas flow rate and/or concentration, or the like during the plasma enhanced chemical vapor deposition process, the presence, type, number, density, and/or distribution of defects in the graphene can be established. In some cases, graphene, such as quasi-1D graphene, can be subjected to additional processing after formation to induce defects that impart optical activity. As examples, graphene can be subjected to doping or oxygen plasma exposure to induce defects. The present disclosure refers to defects induced in graphene during growth as Type-1 defects and defects generated after growth (e.g., by doping or oxygen plasms exposure) as Type-2 defects. In some examples, quasi-1D graphene can include only Type-1 defects, only Type-2 defects, or both Type-1 and Type-2 defects.

The defects present in the quasi-1D graphene may function as optically active sites or color centers, imparting the normally non-photoluminescent graphene material with regions where photoluminescence occurs. Although graphene may be considered a metallic or semimetal material, the defects present in the quasi-1D graphene may function as optical centers within a metallic medium.

The photoluminescence emission lifetime of the disclosed optically active graphene can be relatively large, with emission lifetimes on the order of about 10 ns (e.g., from about 5 ns to about 15 ns). In some cases, the photoluminescence emission lifetime can be tuned (e.g., towards smaller values), such as by processing the graphene to modify the Purcell factor, quality factor (Q), and/or photonic density of states (e.g., by crushing, doping, or otherwise modifying or manipulating the optically active graphene to decrease the quality factor). In some cases, the optically active graphene can be characterized by multiple emission lifetimes that may be convolved, such as a first emission lifetime of about 8 to 15 ns, a second emission lifetime of about 1 to 5 ns, and a third emission lifetime of less than about 1 ns (e.g., from 0.1 ns to 1 ns). In contrast to other materials, the photoluminescence emission lifetime is temperature independent, which allows the optically active graphene to be used in a variety of applications where precise temperature control is difficult.

Further, the optically active graphene can generate coherent photoluminescent emission, supporting use of the material as a laser. For example, the optically active graphene, such as a graphene nanostripe including one or more topological defects and optionally coupled to a substrate, can be subjected to light from a pump source (e.g., a pump laser) to generate coherent light pulses. In some cases, the graphene material itself can function as an optical or resonant cavity with a gain medium therein (e.g., defects/color centers within one or more layers of the quasi-1D graphene), providing for a suitable configuration for lasing to occur. For example, the cavity can be defined by a first interface between the graphene (e.g., one or more layers of the quasi-1D graphene) and the substrate (e.g., silicon) and a second interface between the graphene and air, such as with one or more monolayers of the graphene including topological defect(s) positioned between the interfaces. In some cases, the cavity can be defined by a first interface between the graphene and the air and a second interface between the graphene and air. Advantageously, the lasing may occur with the optically active graphene at any suitable temperature (e.g., at room temperature, below room temperature, or above room temperature), which may arise due to the fact that the photoluminescence generation from the optically active graphene is temperature independent.

An example arrangement of the optically active graphene for use as a laser may include where one or more layers of quasi-1D graphene are arranged or disposed in a growth plane with the resonant cavity orthogonal to the growth plane. Optionally, the pump source may be arranged to inject pump light orthogonal to the growth plane, orthogonal to the substrate, or along the growth plane or a growth direction.

In some cases, the optically active graphene can be used for generating an optical comb or frequency comb, such as where multiple emissions are in phase with one another and/or entangled with one another. Under certain circumstances, pumping the optically active graphene, such as with a pump laser, can result in lasing at multiple different frequencies or wavelengths as a comb of emission. Without wishing to be bound by any theory, several mechanisms may be responsible for comb generation. For example, a Kerr nonlinearity and/or polariton interaction may provide the mechanisms for lasing and/or comb generation. In some cases, comb generation can be induced in optically active graphene by controlling the presence, type, number, and/or distribution of defects in the graphene and/or by controlling the power of the optical pump used for generating lasing within the graphene. The generation of optical combs may be temperature independent, which may again arise due to the fact that the photoluminescence generation from the optically active graphene is temperature independent.

As described above, the optically active graphene can be directly grown on a substrate, with the presence, type, number, and/or distribution of defects in the graphene controlled by growth conditions. In some cases, it may be desirable to transfer the optically active graphene from its growth surface to another structure. Aspects described herein include use of a solvent-based vacuum assisted coating process to transfer graphene from the growth substrate to other substrates. In some examples, the optically active quasi-1D graphene, including defects, prepared on the growth substrate, may be sonicated in a solvent (e.g., cyclohexanone) to exfoliate the as-grown quasi-1D graphene from the surface and suspend it in the solvent. The graphene/solvent suspension may be applied to another substrate, where the substrate can be evaporated, such as, in some cases, under vacuum conditions, and optionally with application of heat. The deposition process can be repeated one or more times to control an amount or number of layers of the quasi-1D graphene that are deposited such that any suitable layer thickness of optically active graphene can be generated.

In some cases, lithographic patterning of a substrate may be used to control the placement and/or growth of the graphene. For example, a hardmask (e.g., alumina) may be deposited over a substrate and then a photoresist layer may be deposited on the hardmask. The photoresist may then be patterned to allow subsequent patterning of the hardmask and create exposed regions of the substrate. The quasi-1D graphene may then be placed on the exposed regions of the surface, such as by using a direct growth process and/or a solvent-based vacuum-assisted coating process.

Optionally, the optically active graphene can be used in optical and/or electro-optical switches. For example, the graphene may be arranged in a configuration where pulses of laser light are generated from the optically active graphene, such as by pumping the optically active graphene with a light source, such as with a high repetition rate laser. In some cases, the graphene can generate a plurality of output laser pulses, each with a separate pulse length, characteristic of the emission lifetimes of the graphene, which can exhibit multiple emission lifetimes (e.g., on the order of less than 1 ns, less than or about 2 ns, and about 10 ns).

In embodiments, the light from the pulsed light source may be split into two optical paths, such that one optical path is delayed relative to the other optical path, such as by a controllable delay stage. The two light paths can direct the split pulses to different optically active graphene structures, though in some cases, the split pulses can be directed to the same graphene structure, optionally by realigning the split pulses along a common path.

The generated pulses of laser light from the quasi-1D graphene can be directed to a photodetector, which can generate output signals proportional to the intensity of light received from the quasi-1D graphene. With multiple pump pulses (arising due to the splitting of the light from the pulsed light source) with a delay time between them received at the graphene, multiple laser pulses are generated by the graphene, which are then received by the detector. Depending on the time delay between the multiple pump pulses, the laser pulses emitted from the quasi-1D graphene may overlap in time, generating periods of higher output by the photodetector than when only a single laser pulse or no laser pulse is received by the photodetector. The output signal from the photodetector can be coupled to a logic circuit to modulate signals based on the time delay between the split light from the light source. In some cases, the photodetector output, or output from a logic circuit coupled to the photodetector output, may be used for modulating the time delay by the delay stage.

Photoluminescence from Graphene Materials

This disclosure demonstrates that quasi-one-dimensional graphene grown on silicon is useful for generating nanoscale coherent light, and also provides methods to directly synthesize these graphene nanomaterials directly on various substrates for applications relating to the use of nanoscale coherent light emission, such as based on photoexcitation.

Unlike typical lasers, which need a gain medium, an external Fabry-Perot cavity (like a Distributed Bragg Mirror), and an optical or electrical pump to drive the laser, this disclosure provides for producing light which may be coherent or nearly coherent, such as based on plasmon polaritons, from zero-dimensional (0D) quantum dots (or color centers) embedded within quasi-one-dimensional (quasi-1D) graphene nanomaterials. Plasma Enhanced Chemical Vapor deposition (PECVD) synthesis with methane/hydrogen carrier gas and some poly-aromatic hydrocarbons (PAH) precursors, such as pyrene, phenol, naphthalene, toluene, biphenyl, anthracene, phenalene, tetracene, or the halogen substituted forms of PAH, etc., can seed direct growth of vertically oriented quasi-1D graphene nanomaterials on silicon. Through careful plasma engineering, point defects can be induced within the quasi-1D graphene nanomaterials that can act as tunable 'color centers'.

Quasi-1D graphene nanomaterials can be directly grown on a silicon substrate using methane and hydrogen carrier gas, with optionally using trace amounts of PAH catalytic seed and/or optionally without any surface pretreatment, using PECVD. U.S. Pat. No. 10,465,291, hereby incorporated by reference, describes techniques for growing graphene nanostripes. In some examples, the use of aromatic seeding precursors can help in controlling the density of topological defects as an additional degree of freedom during synthesis. The growth can precipitate at a range of plasma conditions, such as forward powers from 10 watts, methane/hydrogen flow rates within 50 sccm, where hydrogen is 10 times larger in flow rate than methane, for examples.

Figure 1B:
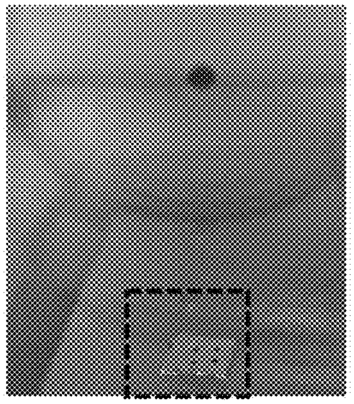
FIG. 1B provides an image of aluminum foil with holes covering a silicon surface with a graphene layer for defect generation according to some embodiments.
Figure 1C:
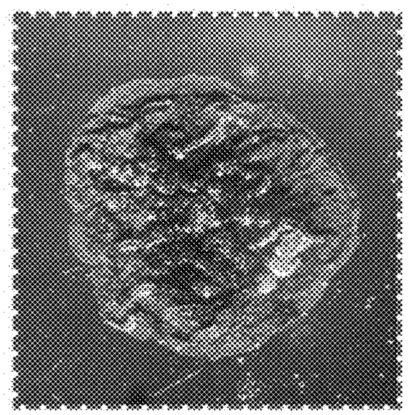
FIG. 1C shows an image of a graphene layer beneath one of the holes in an aluminum foil after exposure to the Ar plasma according to some embodiments.

In some examples, these quasi-1D graphene nanomaterials can be engineered to have defects at specific locations, such as selective areas where the plasma induces damage, or chemical doping occurs in selected areas of the material. In a set of experiments, an aluminum foil with 1 mm holes, depicted in FIG. 1A, made using a syringe needle, was used as a mask for Ar plasma etching (with some trace amounts of oxygen), where the holes served as windows that would selectively expose graphene below the mask to the Ar plasma. FIG. 1B shows the aluminum foil with holes covering a silicon surface with a graphene layer thereon in a chamber for the defect generation. FIG. 1C shows an image of a graphene layer beneath one of the holes in the aluminum foil after exposure to the Ar plasma. These regions were then subjected to exposure to light of various wavelengths to facilitate observation of emitted photoluminescence. This disclosure refers to the topological defects arising from PECVD synthesis as Type-1 defects, while those defects that are engineered by selective area doping, or selective area oxygen plasma exposure are referred to as Type-2 defects.

Figure 1D:
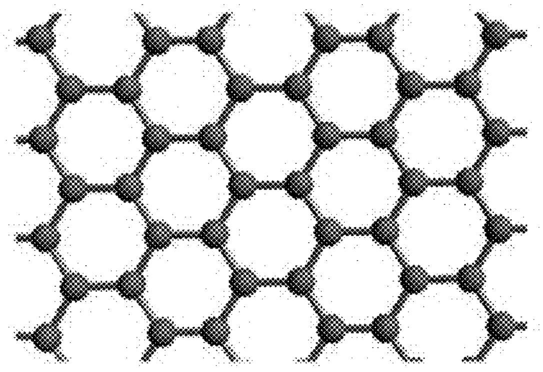
FIG. 1D shows a schematic illustration of graphene with no defects.
Figure 1E:
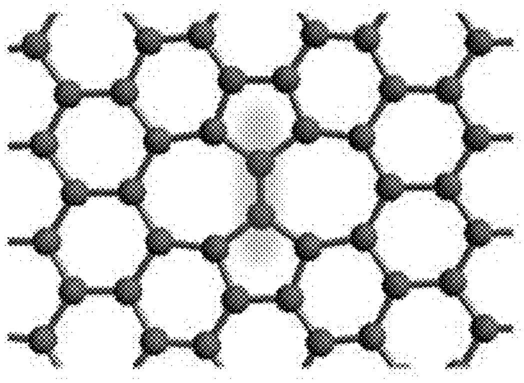
FIG. 1E shows a schematic illustration of graphene with a Stone-Wales type defect.
Figure 1F:
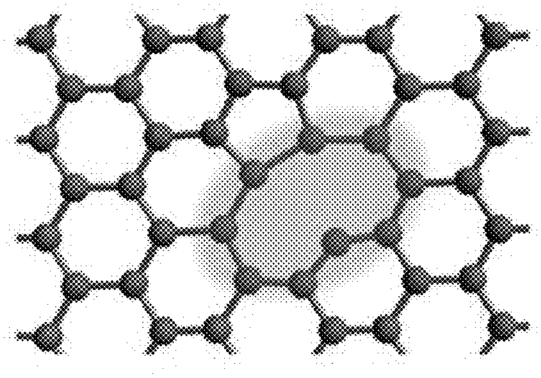
FIG. 1F shows a schematic illustration of graphene with a single vacancy defect.
Figure 1G:
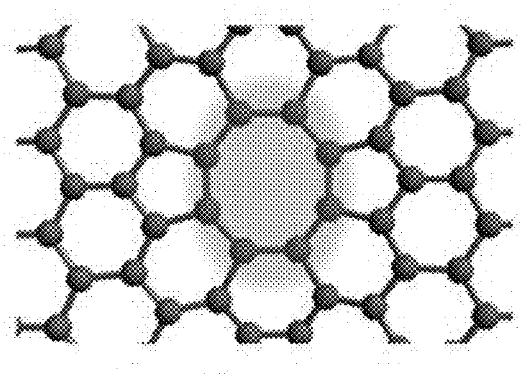
FIG. 1G shows a schematic illustration of graphene with a double vacancy defect.
Figure 1H:
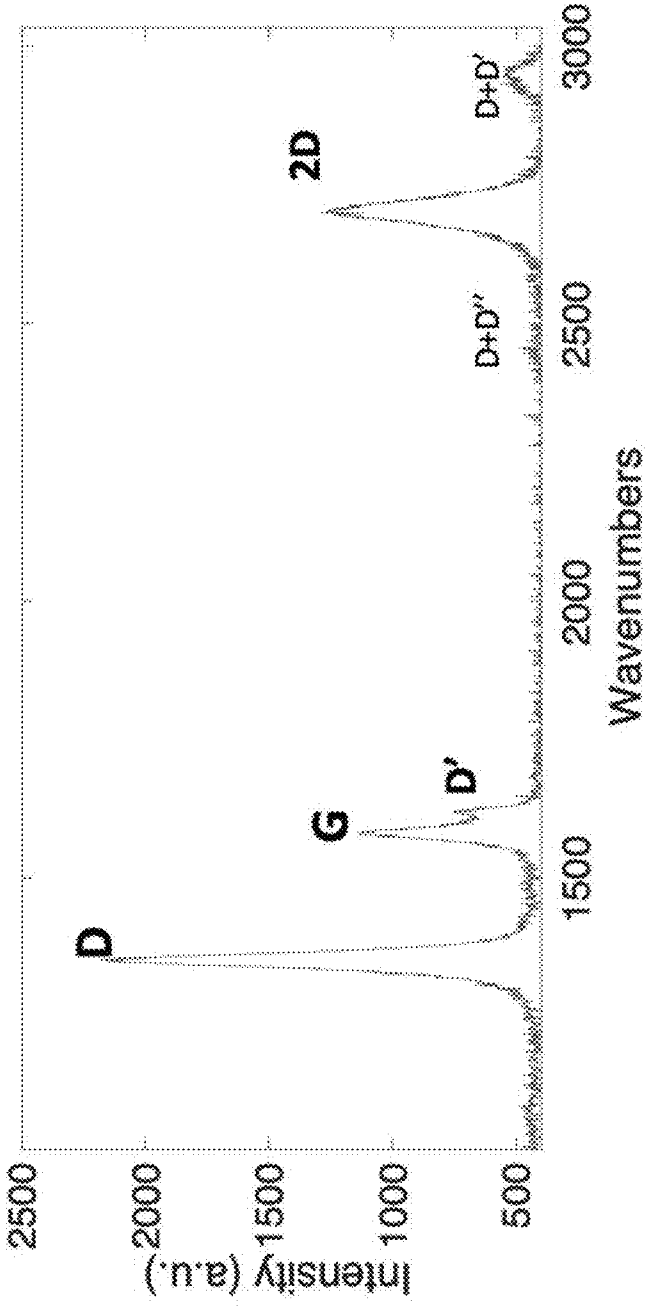
FIG. 1H provides data showing a representative Raman spectrum of a quasi-1D graphene nanomaterial according to some embodiments.

The tunable nature of light emission can be attributed to the excitation-dependent optical gaps in aromatic molecules and quantum dots, such as originating from structural defects, that couple to the strongly interacting plasmon polaritons modes in the quasi-1D graphene nanomaterials. Examples of typical topological defects from the growth and/or processing of quasi-1D graphene nanomaterials are illustrated in FIGS. 1D-1G. FIG. 1D shows graphene with no defects. Graphene without defects does not appear to exhibit photoluminescence upon photoexcitation according to the techniques tested, and the masking approach using holes in aluminum foil was selected to verify that the strong photoluminescence emissions are definitively from regions of the graphene exposed to the Ar/O plasma, where defects occur, and not from graphene where no defects are present. FIG. 1E shows a Stone-Wales type defect in graphene, FIG. 1F shows a single vacancy defect in graphene, and FIG. 1G shows a double-vacancy defect in graphene. In some cases, graphene with defects of this or other characteristics can incorporate oxygen into the graphene. A representative Raman spectrum taken on the quasi-1D graphene nanomaterials is shown in FIG. 1H, which confirms the characteristics of graphene and the presence of edges.

Figure 2A:
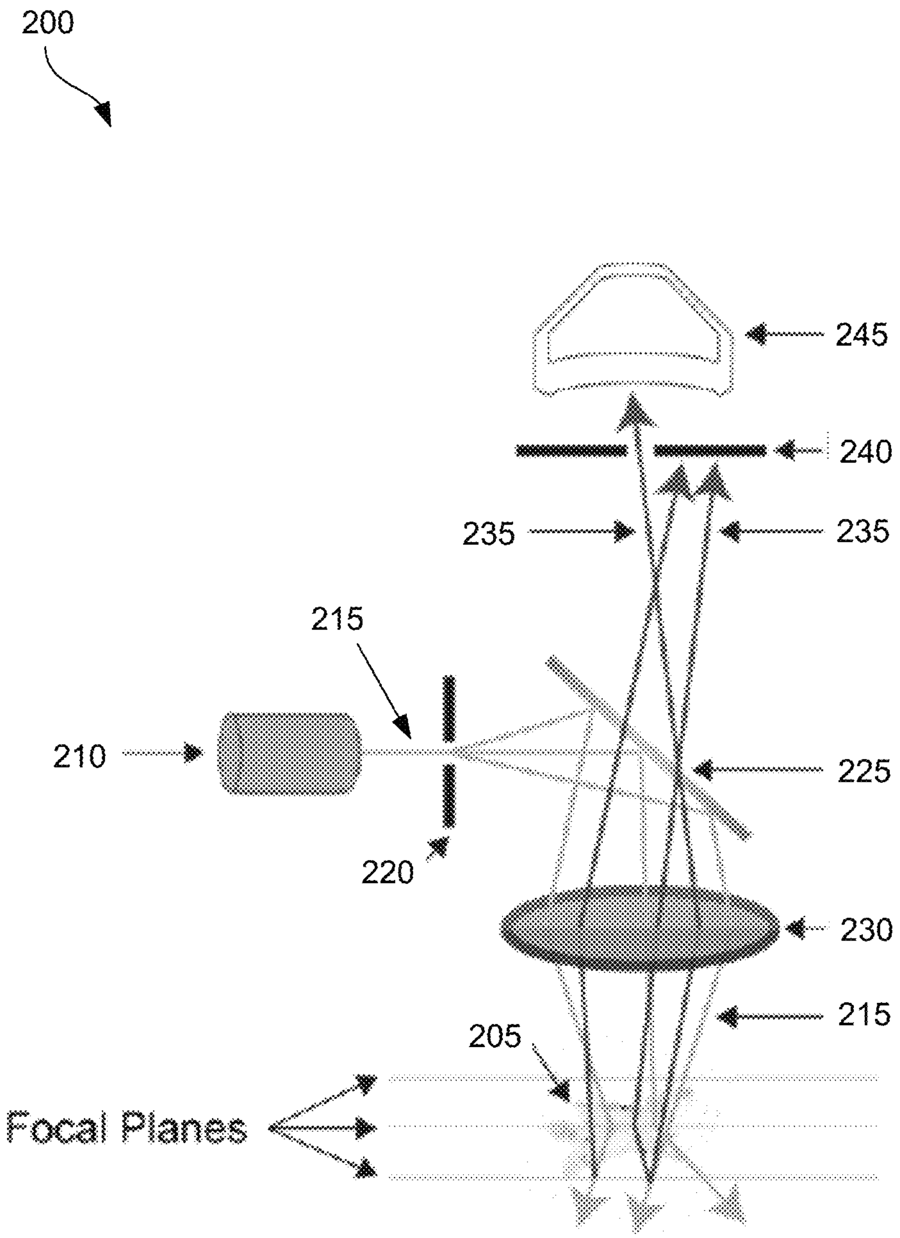
FIG. 2A provides a schematic illustration showing an optical configuration for illuminating graphene and collecting photoluminescence.

FIG. 2A shows an example configuration 200 of optical elements for exposing a graphene sample 205 to light from a pump source 210 for generating and/or detecting photoluminescence by the sample 205. In FIG. 2A, the pump source 210, which may be a laser, emits excitation light 215 that passes through an excitation aperture 220 and is directed towards a graphene sample 205 by a dichroic mirror 225 and through an objective lens 230. Emitted light 235 that is in focus passes through an emission aperture 240 to reach a detector 245, and out of focus emitted light 235 is blocked by the emission aperture 240.

Figure 2B:
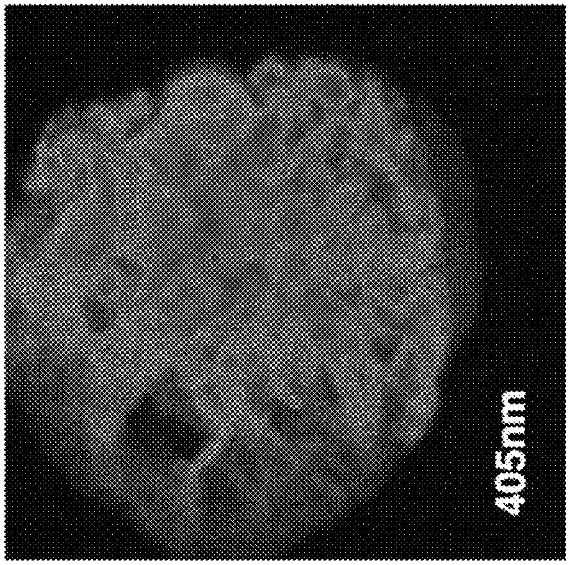
FIG. 2B provides a photoluminescence image of the Ar/O plasma exposed graphene from FIG. 1C with a 405 nm excitation wavelength.
Figure 2C:
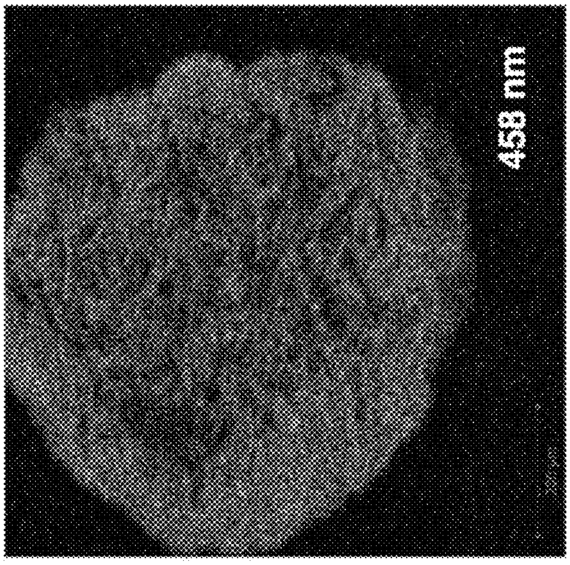
FIG. 2C provides a photoluminescence image of the Ar/O plasma exposed graphene from FIG. 1C with a 458 nm excitation wavelength.
Figure 2D:
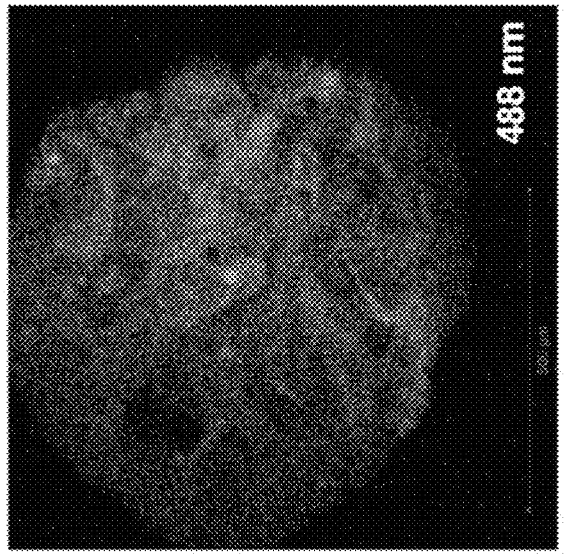
FIG. 2D provides a photoluminescence image of the Ar/O plasma exposed graphene from FIG. 1C with a 488 nm excitation wavelength.
Figure 2G:
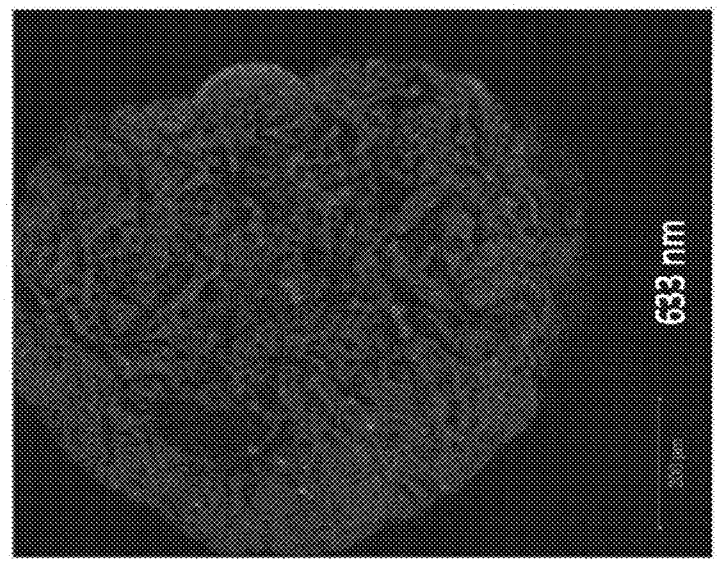
FIG. 2G provides a photoluminescence image of the Ar/O plasma exposed graphene from FIG. 1C with a 633 nm excitation wavelength.
Figure 2F:
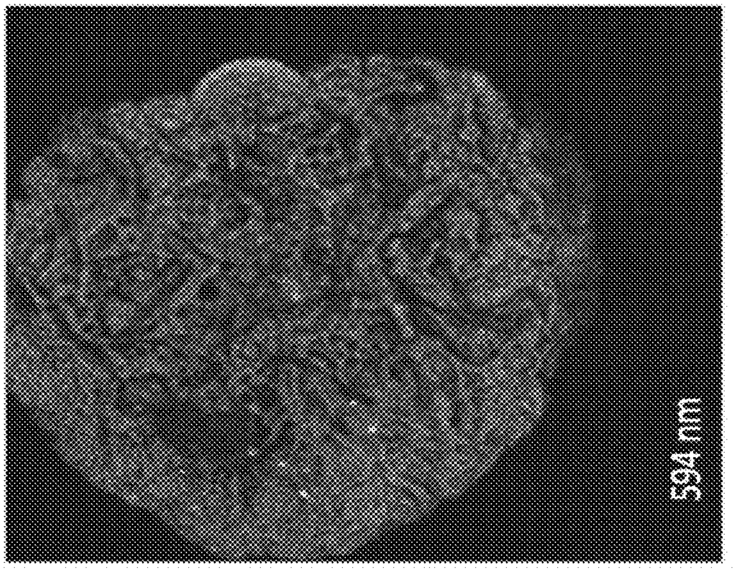
FIG. 2F provides a photoluminescence image of the Ar/O plasma exposed graphene from FIG. 1C with a 594 nm excitation wavelength.
Figure 2E:
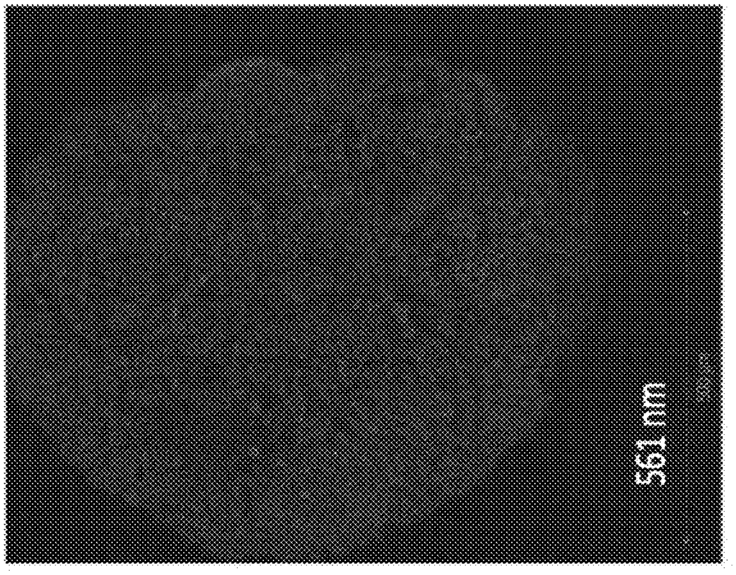
FIG. 2E provides a photoluminescence image of the Ar/O plasma exposed graphene from FIG. 1C with a 561 nm excitation wavelength.

FIGS. 2B-2G shows photoluminescence images of the Ar/O plasma exposed graphene from FIG. 1C. FIG. 2B shows photoluminescence from exposure to a 405 nm excitation wavelength, FIG. 2C shows photoluminescence from exposure to a 458 nm excitation wavelength, FIG. 2D shows photoluminescence from exposure to a 488 nm excitation wavelength, FIG. 2E shows photoluminescence from exposure to a 561 nm excitation wavelength, FIG. 2F shows photoluminescence from exposure to a 594 nm excitation wavelength, and FIG. 2G shows photoluminescence from exposure to a 633 nm excitation wavelength.

Figure 3:
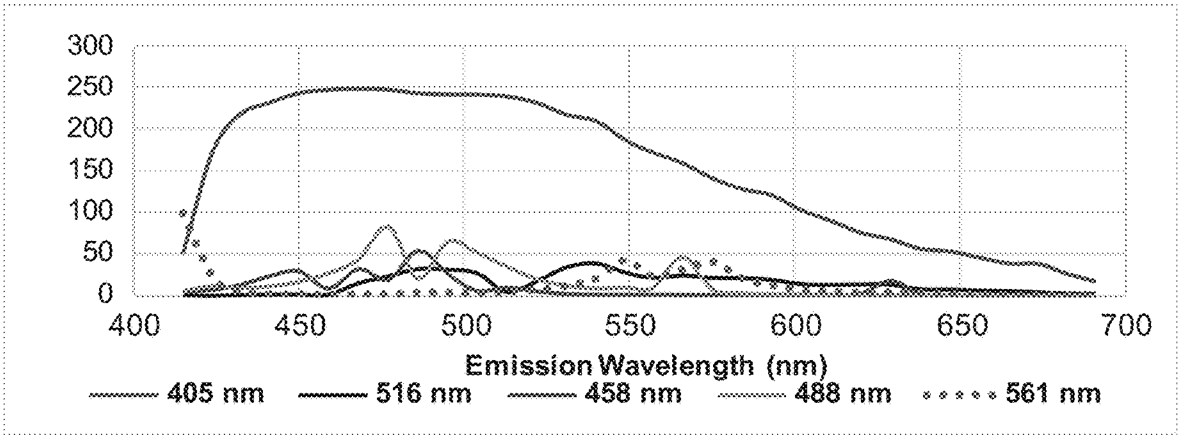
FIG. 3 provides data showing an emission profile of plasma exposed graphene for various excitation wavelengths according to some embodiments.

Photoluminescence spectra of the Ar/O plasma irradiated graphene under different excitation wavelengths are summarized in FIG. 3. The different intensities are related to different peak powers of various excitation lasers used. The 405 nm excitation wavelength is from a pigtailed continuous wave laser diode with a peak power of 15 mW. An Ar laser is used for emissions excited at 458 nm and 488 nm, with a peak power of 25 mW. The pump at 561 nm is from a diode pumped solid state laser, which has a peak power of 20 mW, while the 594 nm laser pump is from a HeNe laser with a peak power of 2 mW, and the 633 nm pump has a peak power of 5 mW. All the laser lines were attenuated with a VIS-AOTF (Acousto-Optical Tunable Filter). The difference in intensities for each emission peak is related to using lasers with different peak powers, keeping similar attenuation factor, but there is a possibility of varying quantum yields for emission based on excitation wavelength. The colors of the photoluminescent emission shown in FIGS. 2A-2F reflect true colors of the emission. A T80/R20 mirror was used to suppress the laser peak emission, and some spectra reflect the color of the pump if the red/blue emission is weaker than the peak color around the laser pump after suppression by the T80/R20 mirror. It should also be mentioned that the detector (GaAsP-PMT) spectral sensitivity is not uniform and the detector quantum yield rolls off at longer wavelengths.

The strong photoluminescence emission from graphene nanomaterials with high concentrations of Type-2 defects that were induced by Ar/O plasma irradiation shows that the photoluminescence emission properties of quasi-1D graphene nanomaterials can be engineered by inducing defects to make the material strongly luminescent.

Figure 4:
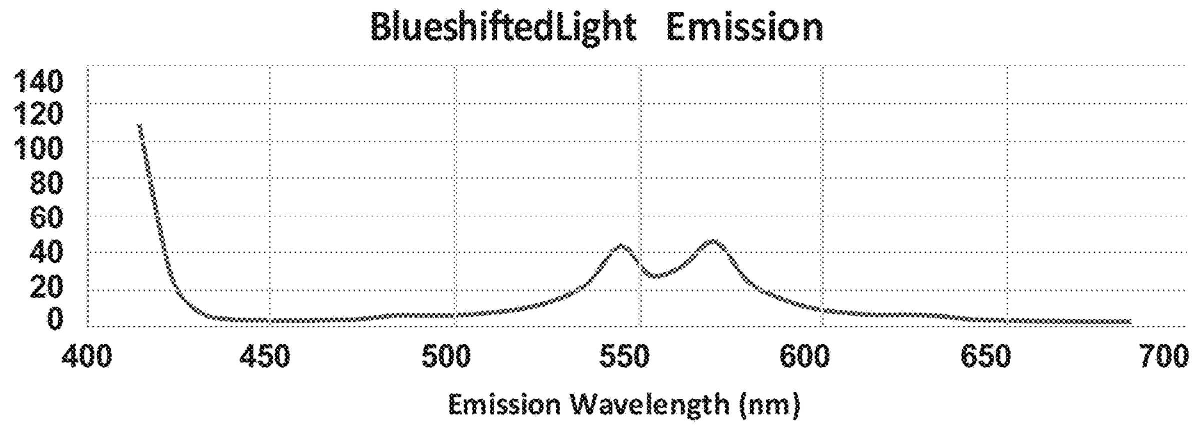
FIG. 4 provides data showing blue-shifted emission of plasma exposed graphene for 561 nm excitation wavelength according to some embodiments.

From the above measurements, a unique nonlinear effect, observed in two-photon or multi-photon absorption processes, is noted for the 561 nm excitation. The appearance of a distinct blue shifted peak (FIG. 3) for 561 nm excitation, commonly called an anti-Stoke fluorescence peak, was investigated further. As shown in FIG. 4, the blue-shifted emission became strongly enhanced when the sample was further treated with trace amounts of $O_2$ plasma. The pump wavelength used here is 561 nm, which is suppressed using a T80/20 mirror (no other optical filter was used). The absence of such a blue shifted peak at other excitation energies also suggested that a resonant pumping of the 2.2 eV energy gap of the defects, which is very close to the C═O bonding energy, was able to manifest some coherent energy exchange, similar to cavity QED in the creation of the upper polariton branch. The appearance of blue shifted emission for excitation at 488 nm, also indicates the presence of other types of graphene defects.

Figure 5:
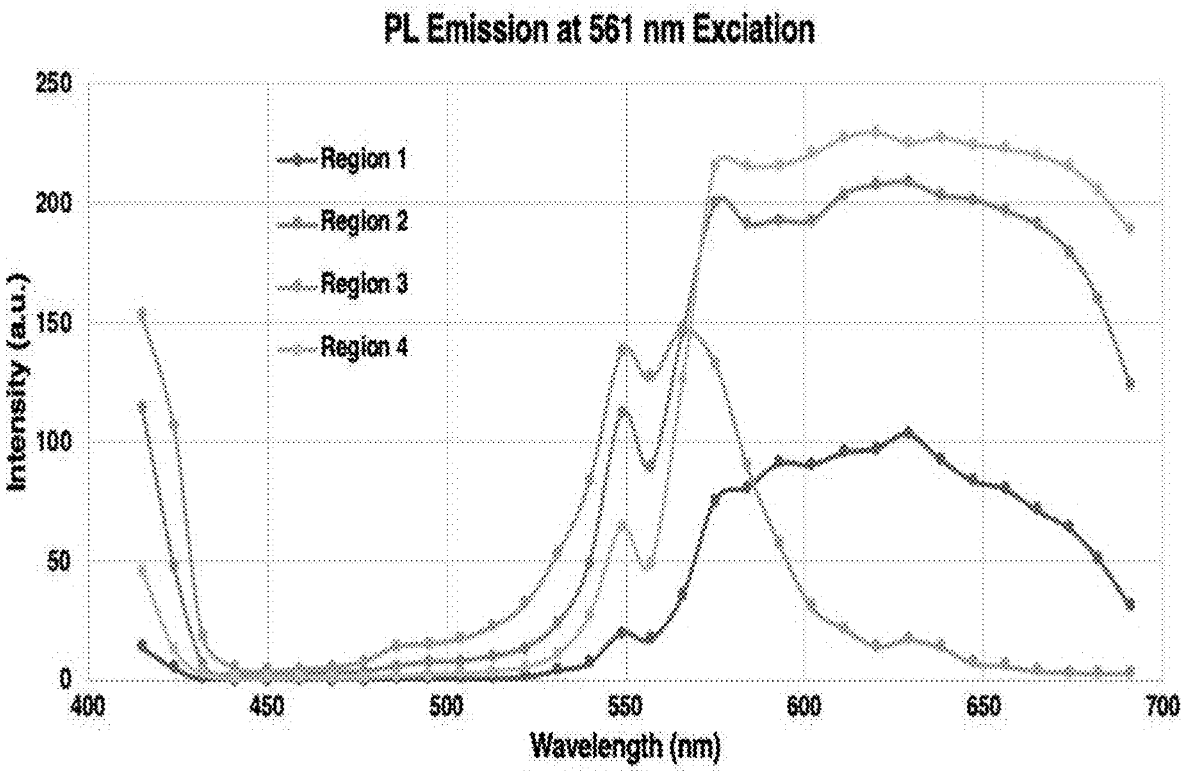
FIG. 5 provides data showing an emission profile of an exemplary quasi-1D graphene with only Type-1 defects according to some embodiments.

The existence of this blue shifted peak in pristine-quasi-1D graphene nanomaterial with sparse topological defects from the growths (e.g., Type-1 defects), as exemplified in FIG. 4, is also indicative that the PECVD synthesis process allows for some reactive oxygen bonding. The creation of C═O bond may take place in the PECVD process chamber as the base pressure of the system is typically 1 torr, which has traces of oxygen; or during the venting process after growth, when the material can become locally oxidized in regions with reactive defect sites post plasma. FIG. 5 shows the blue-shifted emission, in addition to red-shifted emission, from as-grown quasi-1D graphene with only Type-1 defects. The pump wavelength is at 561 nm, which is resonant with the 2.2 eV defect energy.

Long-Lifetime Emission from Graphene with Topological Defects

With identification of the nature of sparse Type-1 defects and engineered Type-2 defects, an investigation of the lifetimes of these color centers was undertaken, as the carrier lifetime in these metastable states is useful for designing metal contacts and verifying the feasibility of hot electron extraction. Pristine two-dimensional graphene has a carrier lifetime much smaller than about 1 ps, and for this reason, excited hot electrons rapidly recombine within a few 100 nm in length, which makes it impossible to place metal contacts sufficiently close to capture them. Two different measurement set-ups were used to investigate the lifetime in the visible light with a Streak camera connected to a Nd:YAG laser at 355 nm pulsed excitation @ 10 Hz repetition rate, and 450-800 nm laser with a time correlated single photon correlator (TCSPC) in a confocal Leica SP8 microscope.

Time resolved photoluminescence (TRPL) measurements were carried out using a Nd:YAG picosecond measurement facility. The instruments for these measurements were an Acton Research Corporation ARC SpectraPro-275 with a 0.275 m triple grating monochromator/spectrograph, a Hamamatsu Blanking unit, a Hamamatsu Fast sweep unit, a Hamamatsu Digital camera C4742-95, a Hamamatsu C5680 Streak Camera, a continuous wave Mode-Locked Nd:YAG laser, and a Regenerative oscillator. The Nd:YAG can emit light at wavelengths of 1064 nm, 532 nm, 355 nm, and 266 nm. A Pellin-Broca prism was used to steer the beam onto the excitation path. A Quantum Composer 9615 was used for the pulse generation.

Figure 6A:
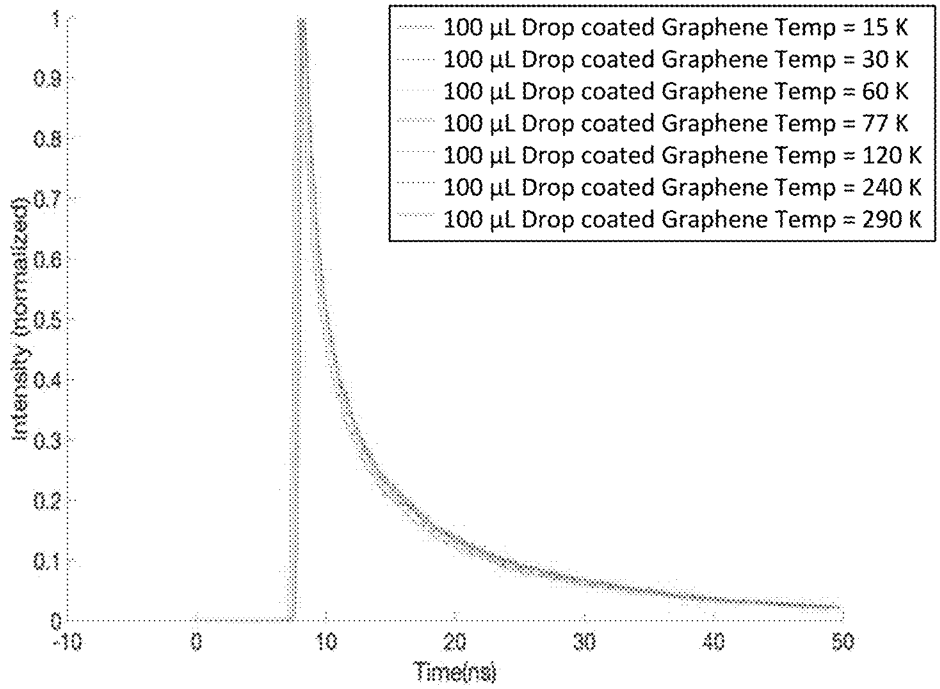
FIG. 6A provides data showing time resolved photoluminescence (TRPL) measurements of an exemplary quasi-1D graphene according to some embodiments.
Figure 6B:
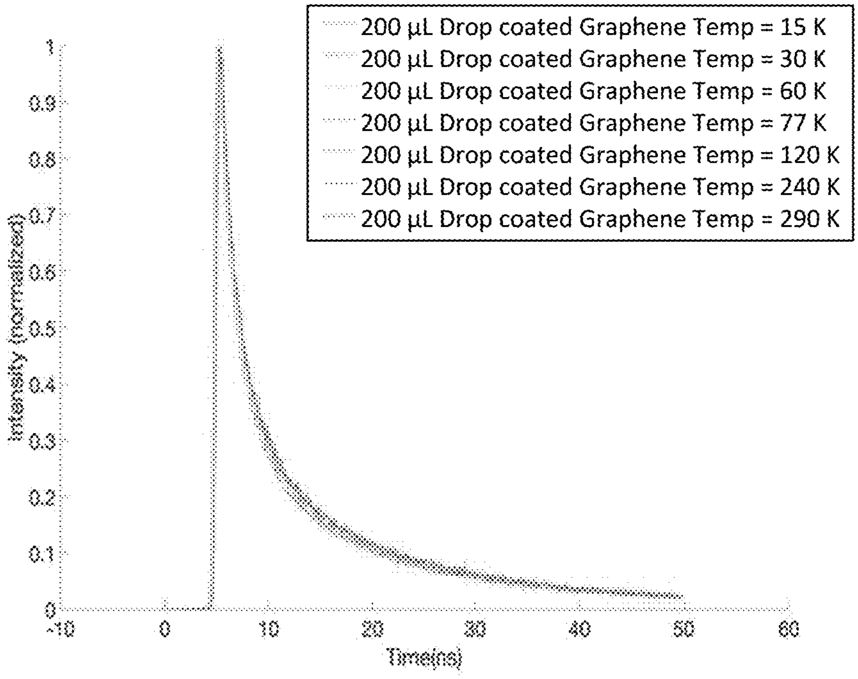
FIG. 6B provides data showing time resolved photoluminescence (TRPL) measurements of an exemplary quasi-1D graphene according to some embodiments.
Figure 6C:
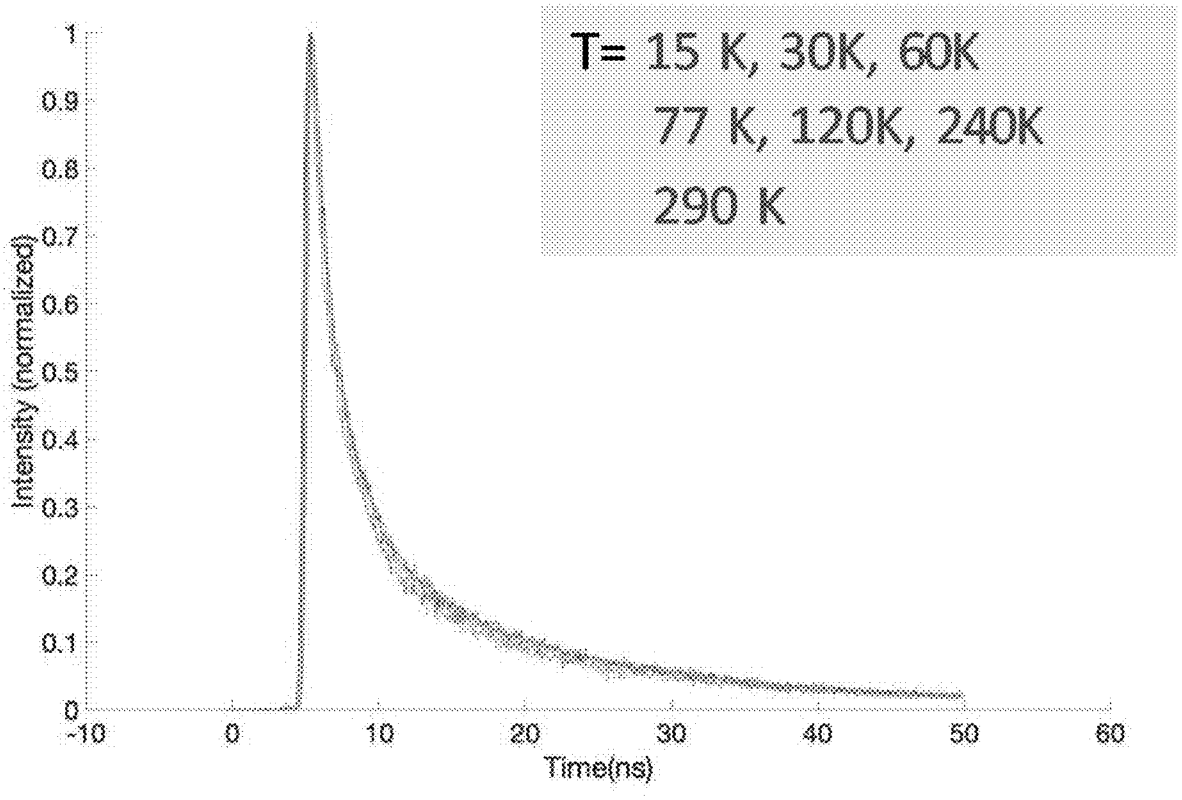
FIG. 6C provides data showing time resolved photoluminescence (TRPL) measurements of an exemplary quasi-1D graphene according to some embodiments.
Figure 7A:
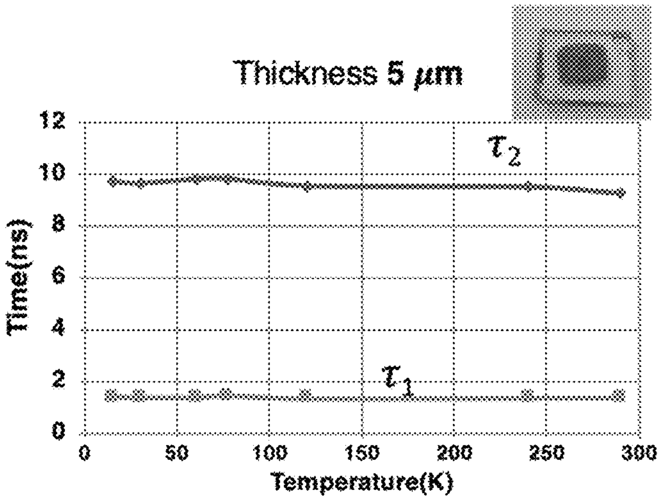
FIG. 7A provides data showing fitted double emission lifetimes $\tau_1$ and $\tau_2$ of an exemplary quasi-1D graphene with 5 μm thickness in relation to various temperatures according to some embodiments.
Figure 7B:
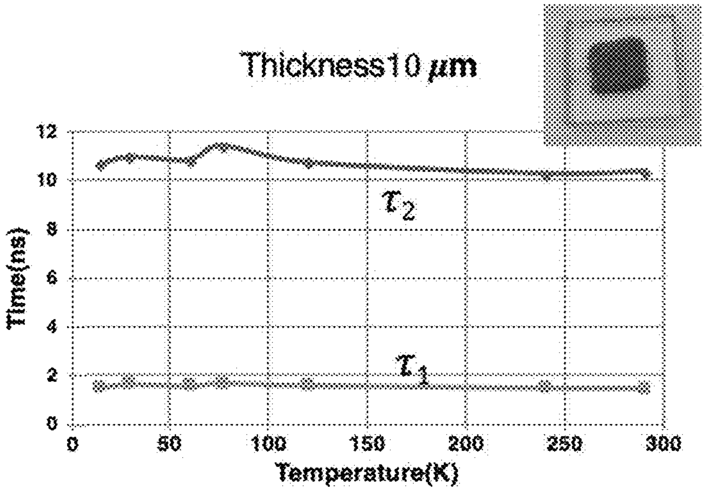
FIG. 7B provides data showing fitted double emission lifetimes $\tau_1$ and $\tau_2$ of an exemplary quasi-1D graphene with 10 μm thickness in relation to various temperatures according to some embodiments.
Figure 7C:
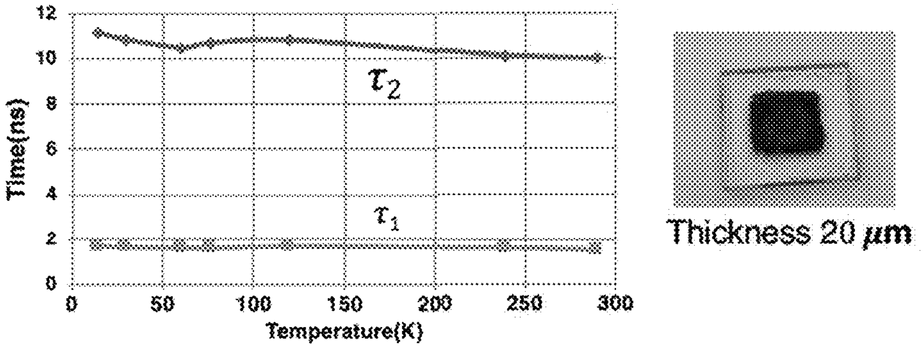
FIG. 7C provides data showing fitted double emission lifetimes $\tau_1$ and $\tau_2$ of an exemplary quasi-1D graphene with 20 μm thickness in relation to various temperatures according to some embodiments.

The physical origin of double exponential TRPL curves, as shown in FIG. 6A, FIG. 6B, and FIG. 6C, with fitted double emission lifetimes $\tau_1$ and $\tau_2$, also referred to as relaxation lifetimes, that appear to be temperature independent, as depicted in FIGS. 7A, 7B, and 7C, was not initially clear, apart from a phenomenological explanation of ultrafast carrier decay initially, and some long lived meta-stable states that have an emission lifetime up to 10 ns.

Figure 8:
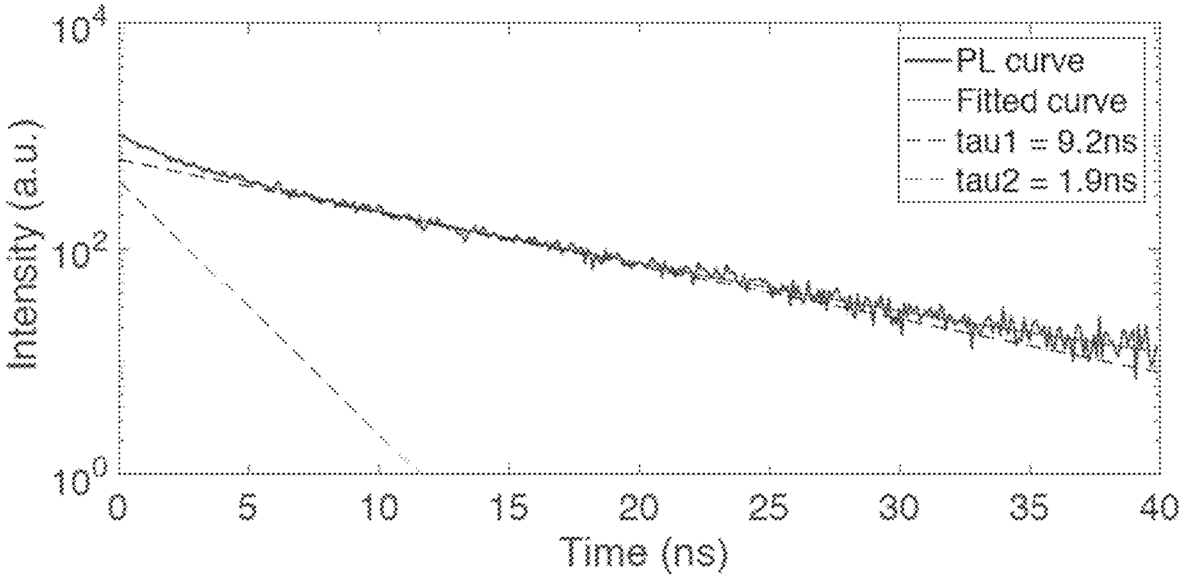
FIG. 8 provides data showing double exponential fitting of emission lifetimes of quasi-1D graphene under 355 nm excitation according to some embodiments.

FIG. 8 shows an example of the double exponential fitting to determine emission lifetimes. Lifetime imaging done with a Nd:YAG/Streak camera system provides insights into an emission lifetime from a spot size about 1 cm in diameter. To get a local mapping of emission lifetime, a Leica SP8 confocal microscope with a PicoQuant TCSPC was used for emission lifetime imaging in the visible spectrum. This additional measurement can provide the local emission lifetime of quasi-1D graphene nanomaterials with sparse and local color centers.

Figure 9:
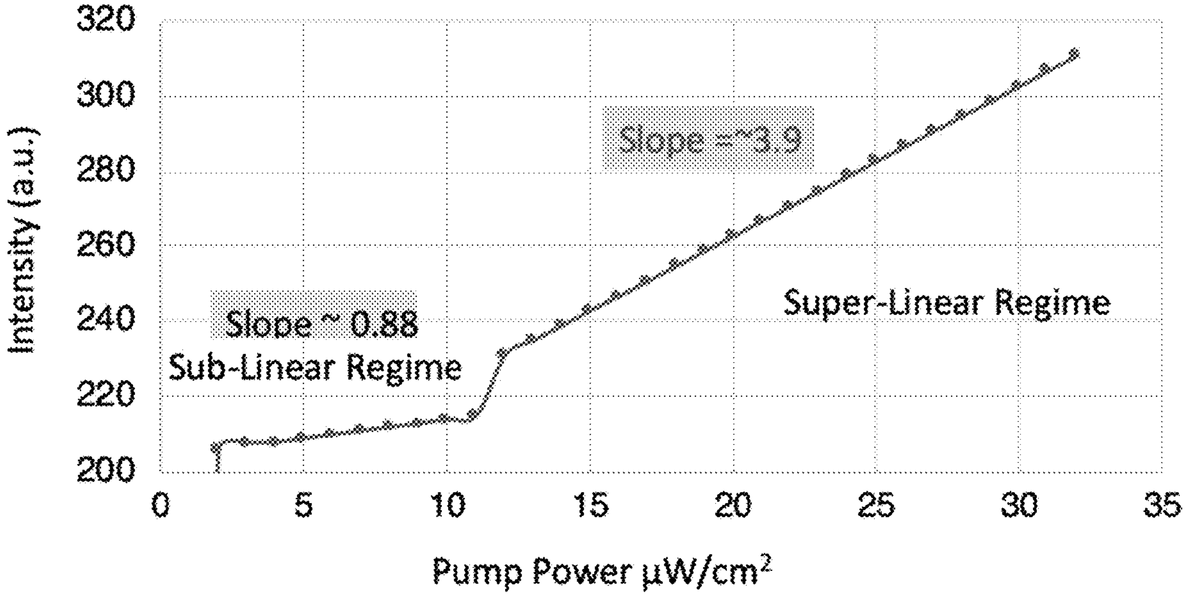
FIG. 9 provides data showing light emission output of quasi-1D graphene in relation to pump power according to some embodiments.

Conventional photon lasers are characterized by a sharp increase in output power beyond a threshold when the gain from stimulated emission exceeds losses. However, in the lack of a well-defined gain medium, the presence of metastable excitonic states also supports the possibility of polariton lasing, when the light emission output scales with the pump power from a sub-linear regime to a super-linear regime at some "threshold", as exemplified in FIG. 9, which shows a power dependence of blue-shifted 450 nm emission intensity for excitation at 561 nm, showing variations from a sublinear regime to a super-linear regime at a threshold power ~12 $\mu W/cm^2$ as a signature of polariton lasing in quasi-1D graphene. Coherent light emission (or "lasing") in such cases does not need population inversion and stimulated emission as the only mechanism. Polariton lasers are seen as the bridge between two rich domains of physics, the photon lasing regime and condensation of bosonic particles in thermal equilibrium. Many-body coherence allows for exciton interactions, where the thermal de Broglie wavelength of excitons exceeds the Bohr radius of the excitons, giving rise to "exciton lasers" without the need for electronic population inversion. Room temperature polariton lasing has been reported in microcavity systems with well-defined semiconductors like perovskites, or CdTe, GaAs, ZnO, etc. The threshold needed for polariton lasing happens at much lower energy than needed for typical photon lasers. The high binding energy of organic excitons (~1 eV) or the Frenkel excitons allows for lasing at room temperatures rather than cryogenic temperatures.

Typical polariton lasers are built with micro-cavities that are fabricated to be resonant at some wavelength to support a single-mode "lasing". In such systems, when the excitation intensity or pump fluence is increased, there is a sharp super-linear increase of the ground state population. At such a crossover, there is a clear reduction in linewidth, indicating increased phase coherence. In examples described herein, the lack of any "single-mode cavity" may allow for a broader coherent state associated with strong interactions among the population of excited states, leading to the transition from a sub-linear regime to a super-linear regime at a threshold power. The signature of polariton lasing seen from this threshold behavior of emission indicates that using these materials directly in optical Fabry-Perot cavities or distributed Bragg reflectors may be useful for higher coherence polariton lasing. The increase in blueshift intensity beyond the threshold power may be attributed to phase-space filling from polariton interactions, which is in line with the experimental observation of the quasi-1D graphene nanomaterial. For implementation of practical polariton lasers, the polariton decay time may be resistant to temperature variation. The earlier results of temperature-dependent photoluminescence studies indeed revealed that the emission lifetime, i.e., the emission relaxation, of pristine quasi-1D graphene nanomaterials was nearly temperature independent from 15 K to 300 K, as shown in FIGS. 7A-7C. Thus, these quasi-1D graphene nanomaterials in a single-mode optical cavity can be useful as visible low-threshold coherent light sources.

Signatures of Higher Harmonic Effects

Figure 10:
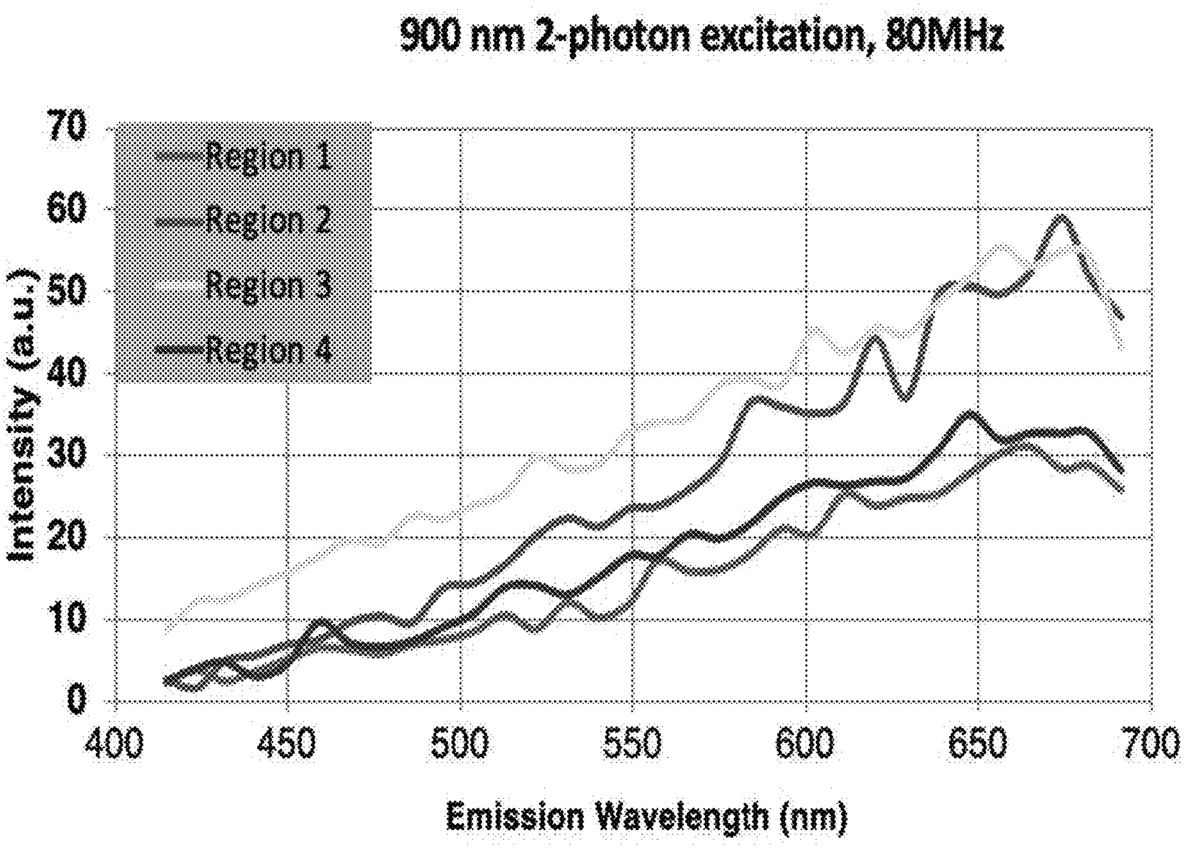
FIG. 10 provides data showing a two-photon emission profile of a quasi-1D graphene sample according to some embodiments.
Figure 11:
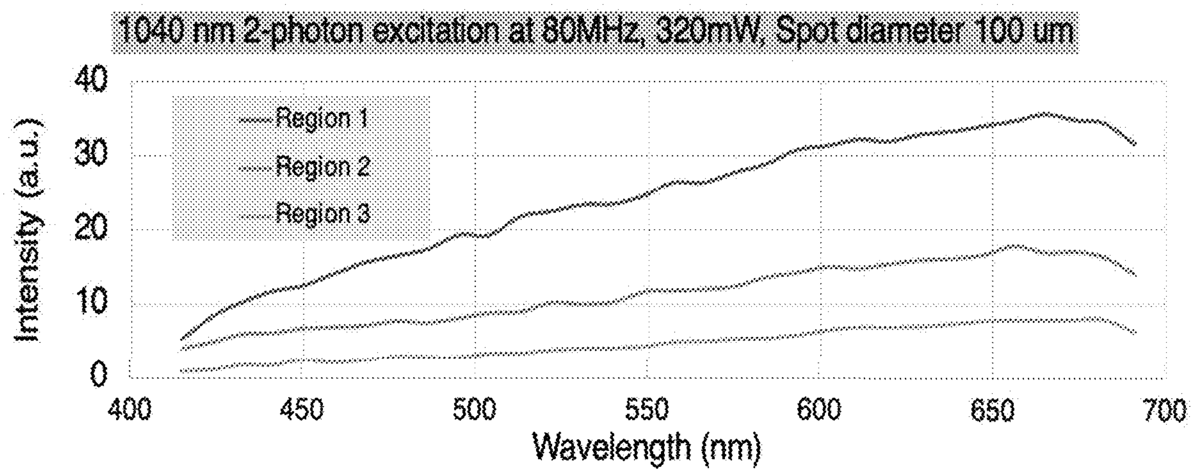
FIG. 11 provides data showing a light emission spectrum of quasi-1D graphene when pumped at 1040 nm by two-photon excitation according to some embodiments.
Figure 12:
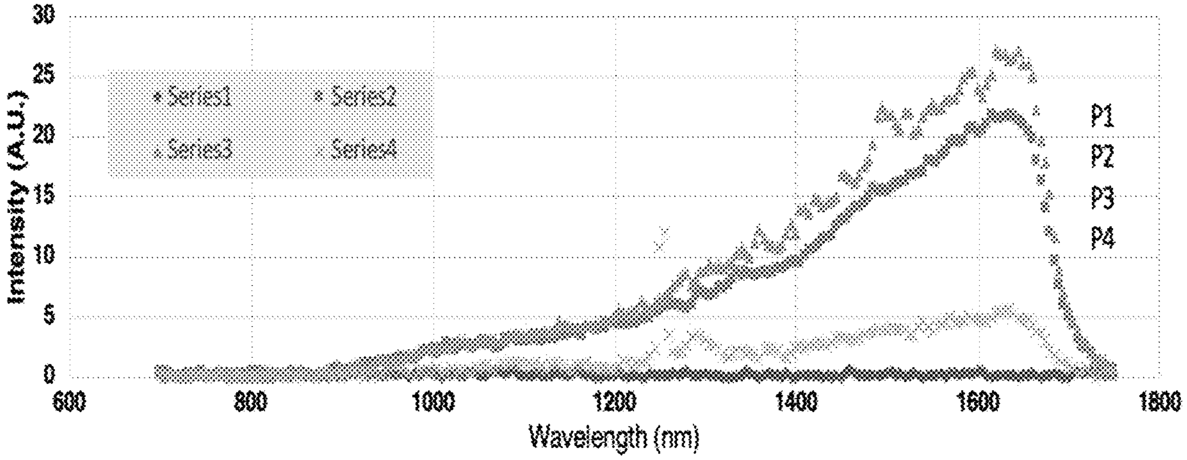
FIG. 12 provides data showing a light emission spectrum of defect engineered quasi-1D graphene when excited at 532 nm using a continuous wave pump laser at different peak powers $P_1$, $P_2$, $P_3$ and $P_4$, where $P_1>P_2>P_3>P_4$.

When quasi-1D graphene nanomaterials were excited with a multi-photon femtosecond laser (Tunable Coherent Chameleon Ultra Laser Inc.), a spectral signature was observed that indicated nonlinear effects from two photon absorption may be present. The laser power used was 164.8 mW with a pulse repetition rate at 80 MHz. The initial results indicated the possibility of coherent emission from some collective low energy states, and possibly nonlinear effects like second harmonic generation may be expected, as quasi-1D graphene nanomaterials have broken inversion symmetry, allowing for both $\chi^2$ and $\chi^3$ effects. The photoluminescence emission measurements taken on a pristine quasi-1D graphene sample shown in FIG. 10 can be compared with the photoluminescence emission measurements that were repeated on samples with engineered defects shown in FIG. 11. FIG. 11 shows the light emission spectrum from the lower energy state of pristine quasi-1D graphene when excited by two-photon excitation at 1040 nm from a pulsed femtosecond light source at 80 MHz. FIG. 12 shows the light emission spectrum from the lower energy states of defect engineered quasi-1D graphene nanomaterial with Type-2 defects.

Moreover, higher emission intensities may be associated with both shorter polariton lifetimes and larger counts of polaritons, and so this does not appear to be solely attributed to a larger population of polaritons in the lower energy (longer wavelength) states. Interestingly, however, this behavior was not just limited to the visible spectrum, but was also observed when as-grown quasi-1D graphene was excited with a 532 nm continuous wave laser, where the emission spectrum was detected using an InGaP infrared detector, as shown in FIG. 12, which shows photoluminescence emission spectra of as-grown quasi-1D graphene when excited with 532 nm continuous wave pump at different peak powers: $P_1$=15 mW, $P_2$=12 mW, $P_3$=6 mW, and $P_4$=3 mW.

The peak power was modulated using a variable attenuator, such that $P_2$=0.8 $P_1$ (orange trace on graph), $P_3$=0.4 $P_1$ (yellow trace), $P_4$=0.2 $P_1$ (blue trace). However, both samples of graphene with Type-1 defects and Type-2 defects exhibited this behavior in parts of the sample, but not uniformly across the samples. As seen in the visible photoluminescence excitation with continuous wave pump, the uniform photoluminescence emission vanished when a pulsed laser was used in an attempt to observe the enhanced intensity towards the lowest excited states. In some sense, there is an increase in linewidth of emission, given the narrow "cold-spot" (lowest energy location) zones that emit such red-photons preferentially.

Graphene being a centro-symmetric crystal does not show any second harmonic generation (SHG). However, local defect clusters can break local inversion-symmetry, thus causing the defect sites to be sensitive to second harmonic effects. This symmetry property of graphene and local broken symmetry of defects can explain why light emission may be observed only from highly localized regions on the quasi-1D graphene. These higher harmonic effects may be useful applications in bioimaging, in-vivo nonlinear light emission for biomedical applications, to name a few possible uses.

Figure 13:
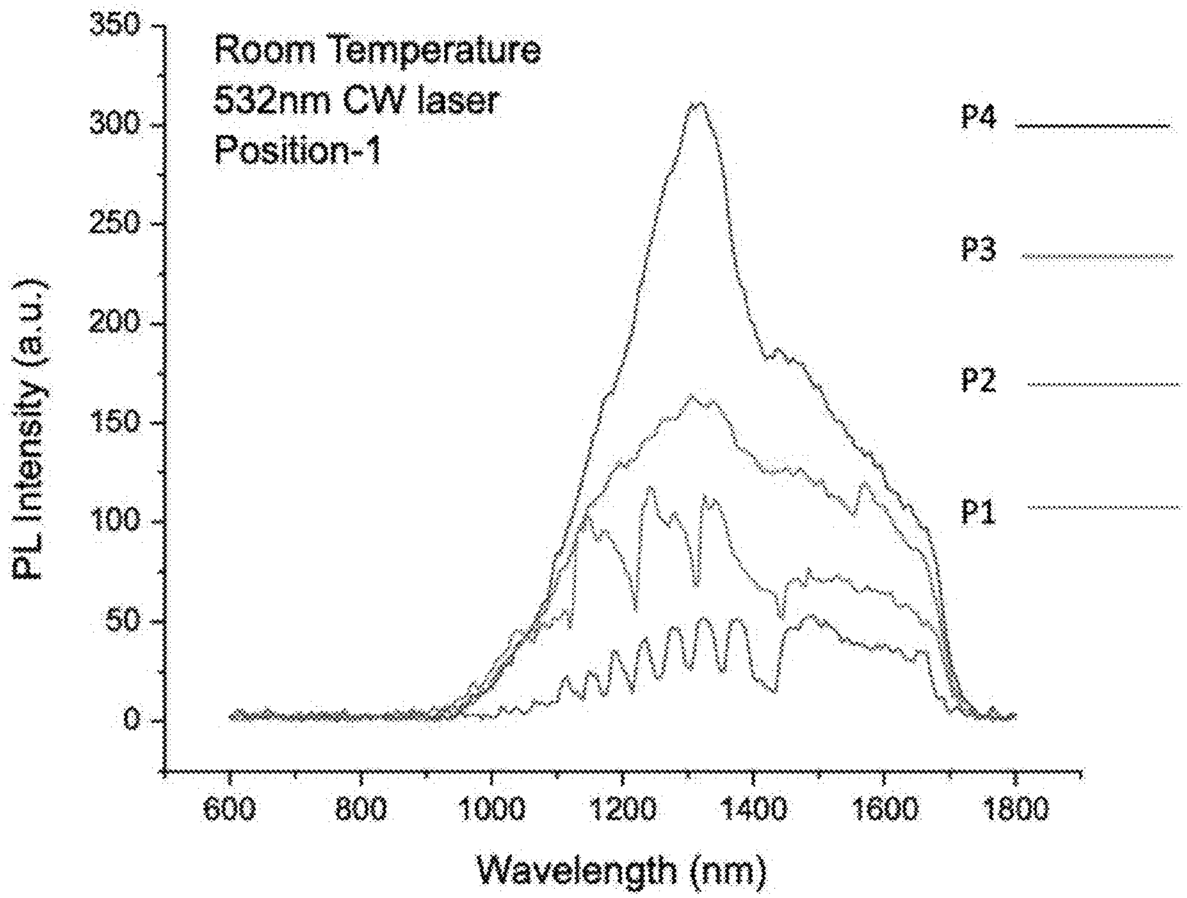
FIG. 13 provides data showing the photoluminescence emission spectra of a quasi-1D graphene sample when excited at 532 nm under different powers $P_1$, $P_2$, $P_3$ and $P_4$ (where $P_1<P_2<P_3<P_4$) according to some embodiments.

Next, different locations on the same exfoliated sample were evaluated to further verify the power dependence of the small peaks. In most other locations, the same trend of a broad photoluminescence emission was found with some minor intensity fluctuations on top. However, at one position called Position-1, a very unique and unexpected photoluminescence emission behavior was observed that resembles some type of standing-wave modes in a Fabry-Perot cavity, as shown in FIG. 13, which shows the photoluminescence emission spectra taken with excitation at 532 nm on Position-1 of an exfoliated sample, showing signatures of leaky cavity modes. Here $P_4$=20 mW. Since no new trend was expected, the measurement was repeated such that $P_4>P_3>P_2>P_1$.

It is worth noting that the photoluminescence emission from this sample only showed such a well-defined cavity mode in one location, which reflects the random/chaotic structure of the exfoliated samples, which indicates that the emission has some pattern of Fabry-Perot modes.

Figure 14:
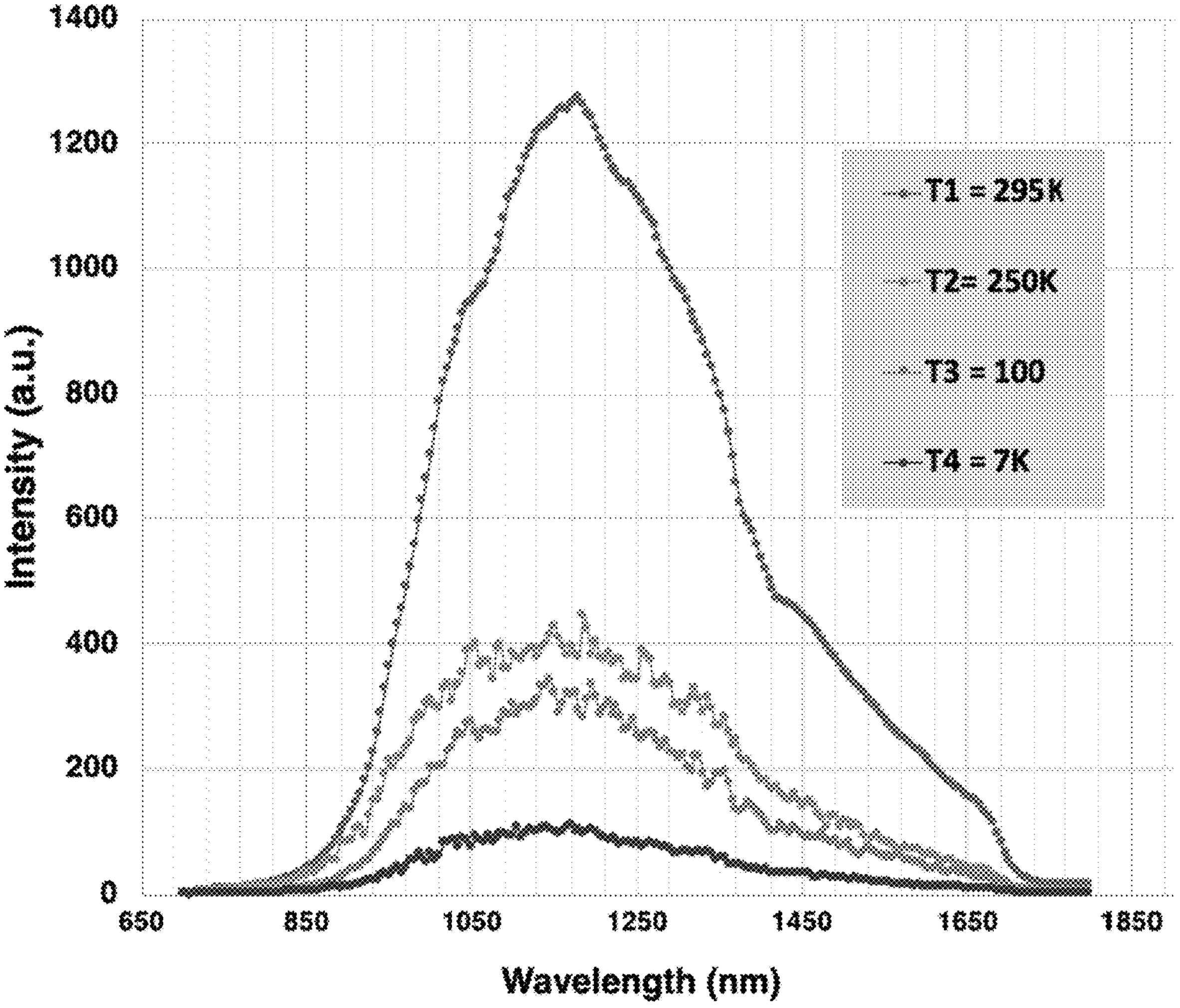
FIG. 14 provides data showing the photoluminescence emission spectra of a quasi-1D graphene sample in relation to temperature when excited at 532 nm according to some embodiments.

In the infrared photoluminescence spectra, some contributions from phonon interactions that would affect the photoluminescence characteristics were expected. Using a helium-cryostat, the sample temperature was cycled from 295 K down to 7 K in order to measure the photoluminescence emission at different temperatures. For most band-gap semiconductors, the photoluminescence emission intensity would be higher at lower temperatures because of the suppression in phonon mediated scattering pathways. Radiative decay is often quenched in phonons exchange energy/momentum with an excited "bright state" to dark states that relax without photon emission due to a momentum preserving relaxation process in the dark states, similar to the indirect band-gap transition. In exfoliated optically active graphene, the inverse effect was observed, where at high temperatures the photoluminescence intensity is higher than those at cryogenic temperatures, as depicted in FIG. 14, which shows the temperature dependent photoluminescence emission characterization with 532 nm excitation under peak power illumination of 20 mW. It appears there is clear trend in the decrease of photoluminescence intensity as the sample temperature was reduced. This trend may rule out the possibility of photoluminescence emission amplified by sample heating. The reduction in photoluminescence L intensity from ~300 K to 250 K showed a sharpest drop in photoluminescence intensity for a 50 K temperature change, whereas from 250 K to 100 K, only a marginal drop in the photoluminescence intensity was observed with temperature. One possible explanation for this nonlinear temperature dependence of photoluminescence intensity could be the mechanism of thermally activated delayed fluorescence (TADF). TADF energy relaxation exploits the thermal bath of the sample to couple with dark states, thus creating more "bright states" for radiative decay at higher temperatures. Noting that the emission lifetimes of the quasi-1D graphene are nearly temperature independent, the scenario of TADF appears to provide a reasonable account for the novel temperature dependence in the photoluminescence intensity.

Room Temperature Lasing Using Graphene with Topological Defects and the Coherent Nature of Light Emission from Quasi-1D Graphene Nanomaterials In optical interferometers such as the Michelson interferometer, Mach-Zehnder interferometer, or Sagnac interferometer, one splits an electromagnetic field into two components, introduces a time delay to one of the components, and then recombines them. The intensity of the resulting field is measured as a function of the time delay. In this specific case involving two equal input intensities, the visibility of the resulting interference pattern is given by:

$$v = |g^{(1)}(\tau)|$$

$$v = |g^{(1)}(r_1, t_1; r_2, t_2)|$$

where the second expression involves combining two space-time points from a field. The visibility ranges from zero, for incoherent electromagnetic fields, to one, for coherent electromagnetic fields. Anything in-between is described as partially coherent. Generally, the first-order correlation function $g^{(1)}(0)=1$ and $g^{(1)}(\tau)=g^{(1)}(-\tau)^*$, and the first-order and second-order correlation functions are defined by the following expressions:

$$g^{(1)}(\tau) = \frac{\langle E^*(t)E(t+\tau)\rangle}{\langle |E(t)|^2\rangle},\ g^{(2)}(\tau) = \frac{\langle I(t)I(t+\tau)\rangle}{\langle I(t)\rangle^2}$$

Figure 15A:
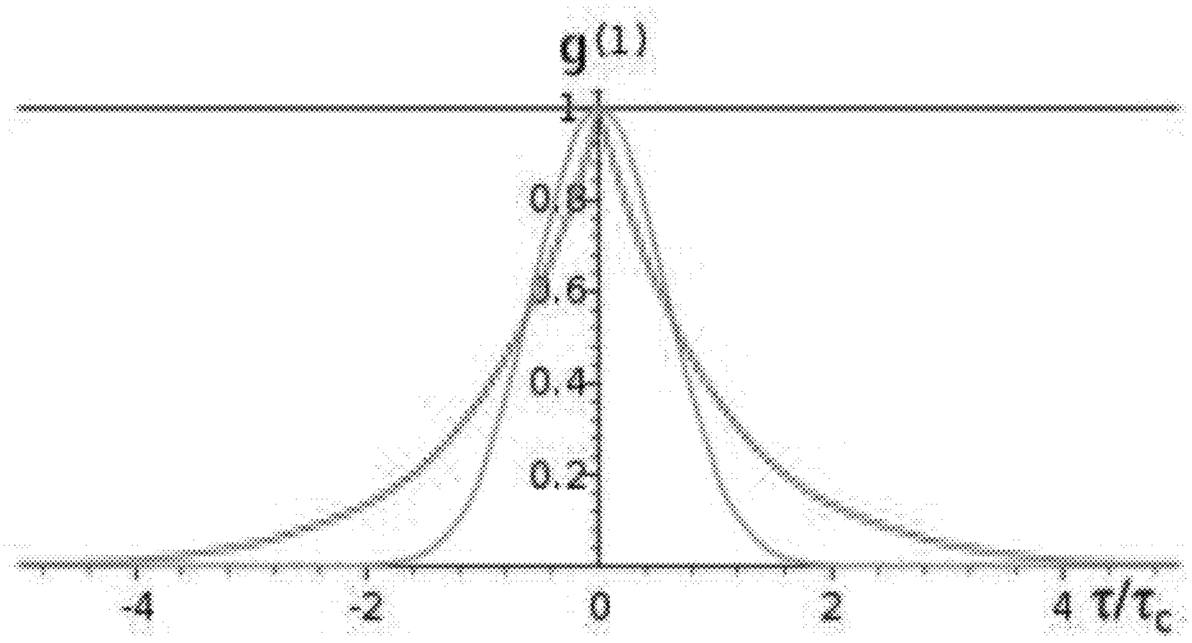
FIG. 15A provides a graphic illustration of the first-order correlation g(1) for laser light (blue) as a function of the time delay $\tau$ normalized to the coherence time $\tau_c$ according to some embodiments.
Figure 15B:
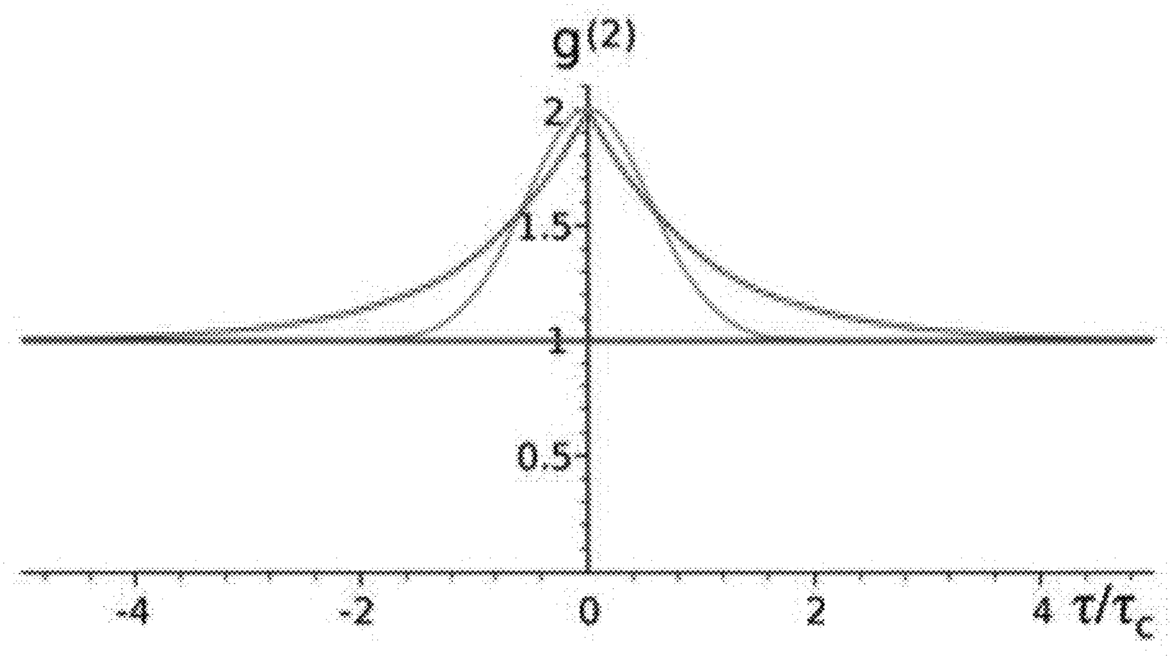
FIG. 15B provides a graphic illustration of the second-order correlation g(2) for laser light (blue) as a function of the time delay $\tau$ normalized to the coherence time $\tau_c$ according to some embodiments.

This is also exemplified in FIG. 15A and FIG. 15B, which depicts the typical behavior of the first-order correlation (FIG. 15A) and the second-order correlation (FIG. 15B) for laser light (blue) as a function of the time delay $\tau$ normalized to the coherence time $\tau_c$. The blue curve is for a coherent state (an ideal laser or a single frequency). In contrast, the red curve represents a Lorentzian chaotic light (e.g., collision broadened), and the green curve is for a Gaussian chaotic light (e.g., Doppler broadened).

Figure 16A:
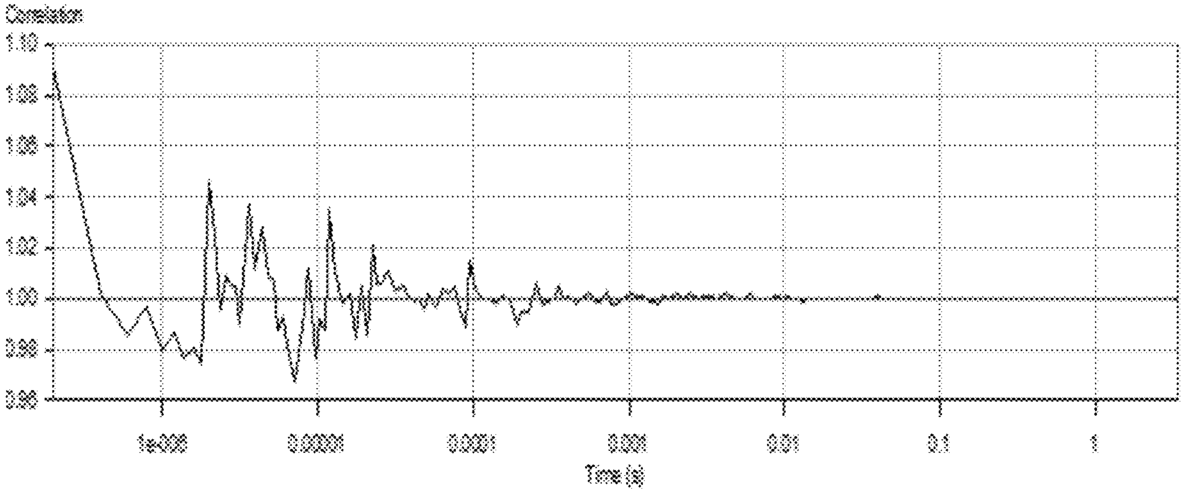
FIG. 16A provides a plot of the second-order correlation measurement of an exemplary quasi-1D graphene grown on silicon substrate according to some embodiments.

The emission of light from quasi-1D graphene nanomaterials grown on a silicon substrate was studied by pumping 561 nm light on the sample and then correlating the intensity from two detectors by splitting the emitted light with an MBS-type beam splitter. The plot in FIG. 16A, which shows measured second order correlation of quasi-1D graphene grown on silicon substrate for the second order correlation $g^2(\tau)$, clearly indicates that the emitted light is nearly coherent in nature. FIG. 16A represents the nearly coherent nature of light emission when excited with CW 561 nm (power 5 mW) for up to 0.01 s. Here $g^2(\tau)$ in FIG. 16A was not normalized to the coherence time $\tau_c$ because the determination of $\tau_c$ would require a more rigorous measurement in an interferometer. Further studies can be useful for measuring the $g^2(0)$ values for various emission lines and to identify to what degree the spatial and temporal coherence of scattered light can be tuned by engineering material properties like the aspect ratio of the quasi-1D graphene nanomaterials or defect engineering for allowing three-level lasing like situation to be conducive. In any case, the coherent light emission demonstrated here from quasi-1D graphene nanomaterials on silicon indicates that these materials are useful gain media for lasers.

Signature of Spatial Coherence: Interference Fringes

Among many ways of characterizing the coherence of light, a Michelson interferometer is usually the best technique to identify the coherence time from correlations measurements. On the other hand, to identify the spatial coherence, the observation of interference fringe patterns is a unique signature of coherent light.

Figure 16B:
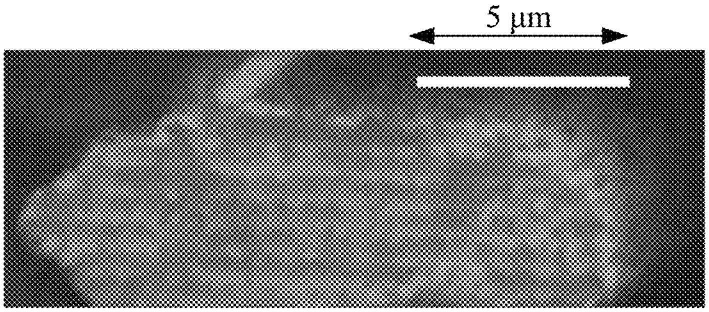
FIG. 16B provides an image of a light-emitted quasi-1D graphene sample under 470 nm excitation according to some embodiments.
Figure 16C:
FIG. 16C provides an image of a light-emitted quasi-1D graphene sample under 470 nm excitation according to some embodiments.
Figure 16D:
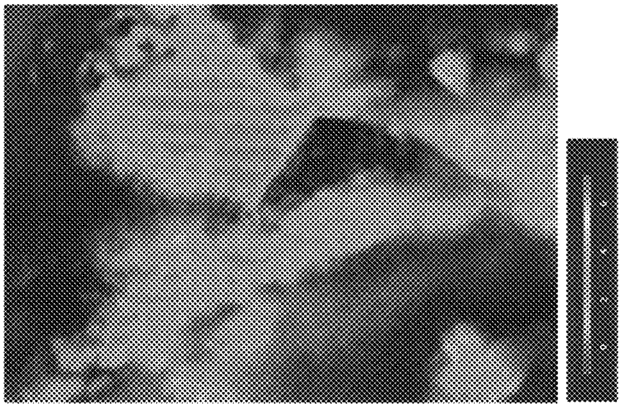
FIG. 16D provides an image of a light-emitted quasi-1D graphene sample under 470 nm excitation according to some embodiments.

As exemplified in FIG. 16B, FIG. 16C, and FIG. 16D for studies of the spatial coherence of emitted light from an as-grown quasi-1D graphene sample under 470 nm excitations, apparent interference fringes are indicative of the coherent nature of light emission. FIGS. 16B-16D show false color intensity fringe patterns taken on different areas of an as-grown quasi-1D graphene sample when excited with 470 nm light at 80 MHz, peak power 10 mW, spot diameter 80 μm; the scale bar is 5 μm. Here the lifetimes observed in the sample (0.58 ns and 2.0 ns) shown in FIGS. 16B-16D are shorter than those found in another sample shown in FIGS. 7A-7C. Despite the shorter exciton lifetimes in this sample, the coherent nature of the emitted light still confirms that quasi-1D graphene nanomaterials are suitable media for coherent light emission regardless of the specifics of the two-level systems embedded in the media. Typical interference fringes with a high coefficient of finesse (on the order of $10^3$) will have sharp bright and dark bands. However, when the coefficient of finesse is less than 1, smeared fringe patterns such as those seen in FIGS. 16B-16D appear.

The material parameters that are of interest here for novel photonic properties include: N two-level (or more generally, m-level energy states, where $m \geq 2$) systems, which can be introduced by defect engineering various functional groups or topological defects naturally formed during the growth; the lifetime $\tau \equiv \gamma^{-1}$ of such defects, where $\gamma$ denotes the spontaneous decay rate of the two-level system; the cavity decay rate $\varkappa$; the coupling strength g between the cavity and the two-level system; and the Rabi splitting $\Omega_R$ in the strong correlation regime so that there are upper and lower polariton energy levels splitting from such defect states.

Figure 17A:
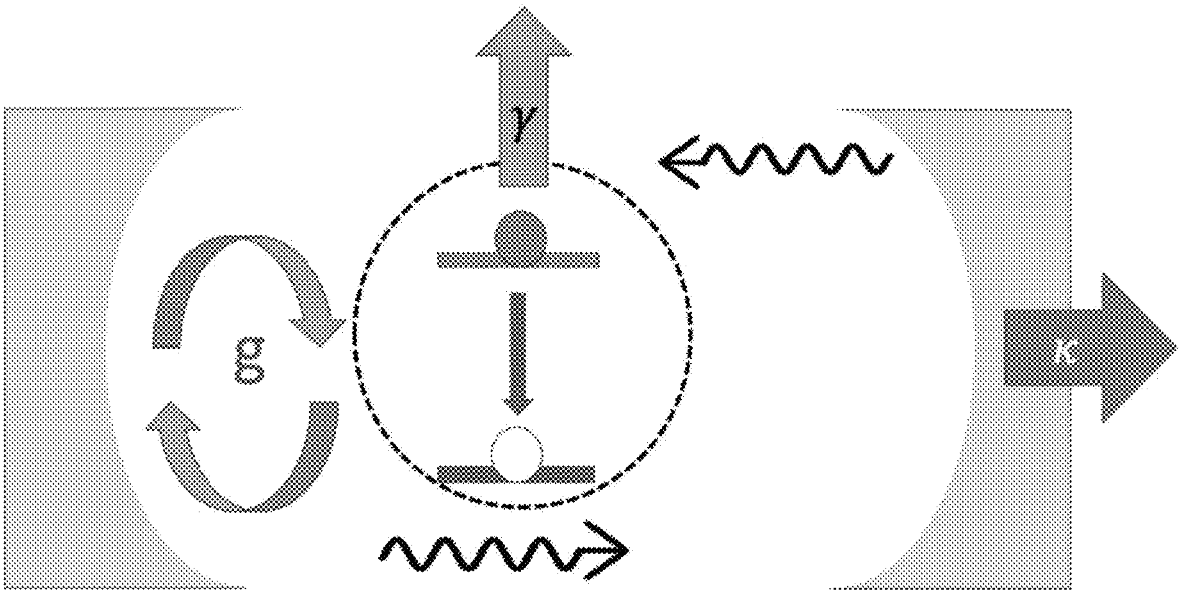
FIG. 17A provides a schematic illustration of an optical cavity with a two-level system.

Strong optical mode confinement in graphene can be achieved through quasiparticles, such as plasmon polaritons or exciton polaritons that propagate along the length of the quasi-1D graphene nanomaterials. High harmonic generation, enhanced Raman scattering, chemical reaction rates enhancements, observation of Bose condensation and coherent emission, etc., are a few documented effects under the strong coupling regime. In this regime, the physics of the cavity-QED system can be described by hybrid eigenmodes of the coupled system, such as the upper and lower polaritonic modes. When the coupling constant g becomes non-negligible, ultra-strong coupling such as common observation for organic materials in high-Q optical cavity can be realized. FIG. 17A shows an optical cavity with a two-level system (e.g., like a point defect), which depicts the cavity-QED formalism for defect-based lasing emission. Here, the system comprises a single mode of the electromagnetic field in a cavity with a decay rate $\kappa$ and a coupling strength g to a two-level system with a spontaneous decay rate $\gamma$.

It should be noted that such "optical cavities" in the cavity QED systems need not be typical resonators such as a sawtooth resonator, a whispering gallery mode resonator, or photonic crystals, etc. Such effective optical cavities may be formed by quasi-1D graphene nanomaterials that could be treated as effective multi-mode coupled resonators with deep-subwavelength confinement of optical modes (plasmonic mode) or by quantum confinement effects (of the exciton) within the length scales of the quasi-1D nanostructures. The refractive index mismatch at the interface of the quasi-1D graphene nanomaterials with the substrate and with air may be treated as effective mirrors that confine optical modes to support lasing.

The optically active graphene may exhibit strong coupling between material excitations (e.g., excitons) and the optical modes confined within the nanostructured cavities to produce polariton quasiparticles, which may lead to nonlinear behaviors.

Figure 17B:
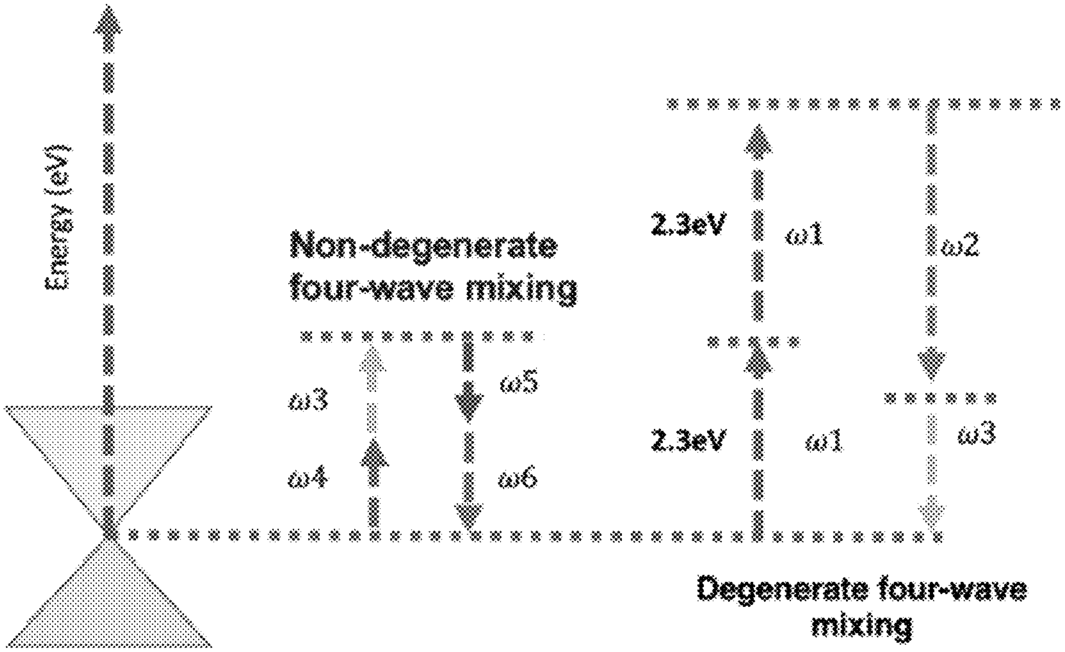
FIG. 17B provides an energy level diagram for third-order non-linear processes in graphene at energies beyond the linear-dispersion energy.
Figure 17C:
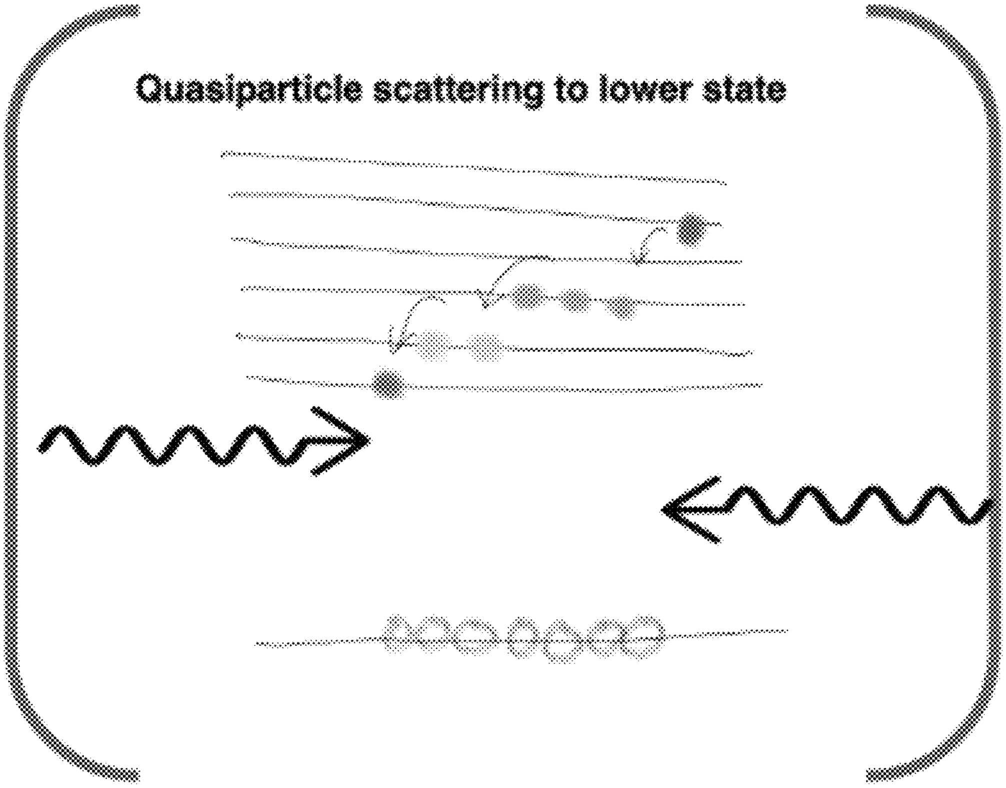
FIG. 17C shows a schematic of quasiparticle collective scattering to lower excited states under a strong correlation regime.

FIG. 17B shows an energy level diagram for third-order non-linear processes in optically active graphene that may occur at energies beyond the linear-dispersion. Kerr interactions in graphene can lead to third harmonic generation, where the signal and idler can regenerate other harmonics. FIG. 17C shows a schematic of quasiparticle collective scattering to lower excited states under a strong correlation regime, which can lead to formation of a comb of emissions. Spontaneous emergence of spatio-temporal order—pattern formation—in non-equilibrium systems represents an important mechanism of self-organization in nature. Kerr frequency combs in the dissipative soliton regime are an example of such self-organizing driven dissipative systems, where there is a double balance between nonlinearity and dispersion as well as dissipation and gain. Further details on self-organization in driven dissipative systems are described in "Novel Light-Matter Interaction in Quasi-One-Dimensional Graphene Nanomaterials for Photonics," Ph.D. thesis by Deepan Kishore Kumar, California Institute of Technology, 2021, which is hereby incorporated by reference.

Figure 17D:
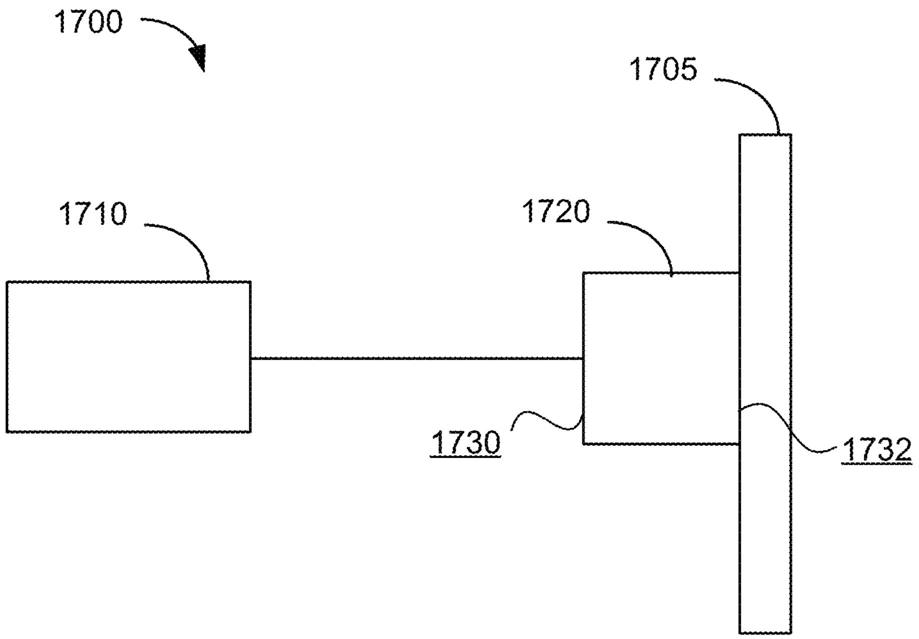
FIG. 17D illustrates a laser according to an embodiment of the present invention.

FIG. 17D illustrates a laser according to an embodiment of the present invention. A laser 1700 can be implemented using pump laser 1710, which is used to optically pump one or more layers of quasi-1D graphene nanomaterials 1720 disposed on a substrate 1705, for example, silicon. The one or more layers of quasi-1D graphene include a topological defect. In some embodiments, the one or more layers of quasi-1D graphene comprise a graphene nanostripe coupled to the substrate. The graphene nanostripe can be characterized by its length, width, and thickness of one to several monolayers, wherein the length to width ratio is greater than 10:1. As illustrated in FIG. 17D, the one or more layers of quasi-1D graphene form a resonant cavity of the laser. Each of the one or more layers of graphene can be disposed in a growth plane and the resonant cavity is orthogonal to the growth plane. In this case, the resonant cavity is defined by a graphene/air interface 1730 and a graphene/substate interface 1732. The resonant cavity is thus formed as a one-dimensional cavity including the topological defect. In other embodiments, the each of the one or more layers of graphene are disposed in a growth plane and the pump laser is operable to inject pump light orthogonal to the growth plane. In the embodiment illustrated in FIG. 17D, the pump laser is operable to inject pump light orthogonal to the substrate 1705. In some implementations, the topological defect in the one or more layers of quasi-1D graphene forms a quasi-one-dimensional structure and the pump laser is operable to inject pump light into the one or more layers of graphene along the growth direction.

Figure 18:
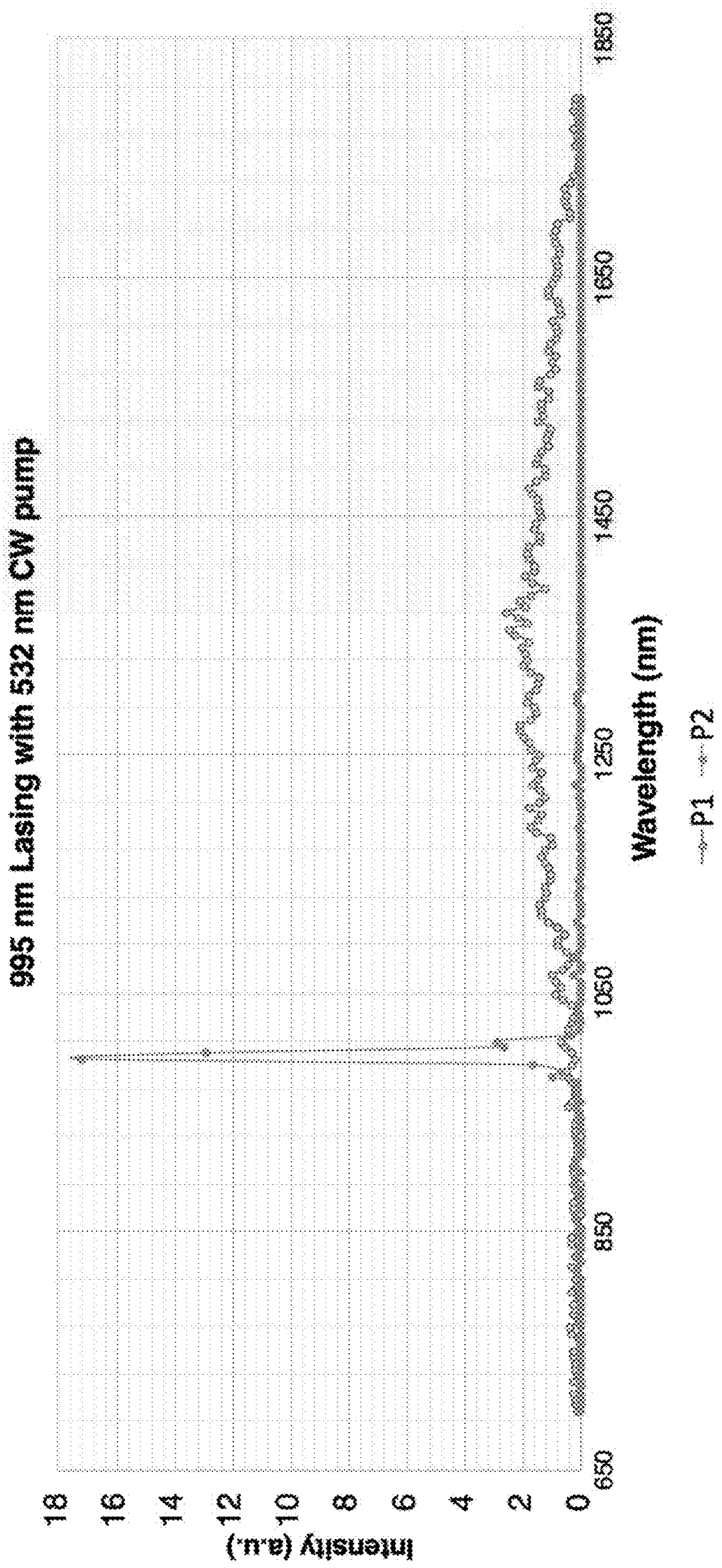
FIG. 18 provides data showing the photoluminescence emission spectra of an as-grown quasi-1D graphene sample excited by a continuous wave pump at 532 nm under two different powers $P_1$ and $P_2$ (where $P_1<P_2$) according to some embodiments.

Observation of Lasing Emission from Quasi-1D Graphene Nanomaterials With Color Centers Given the unexpected photoluminescence emission spectra from exfoliated graphene nanomaterials showing signatures of thermally activated delayed fluorescence and photoluminescence emission of a leaky multi-mode Fabry-Perot like emission in some random locations, further investigations of photoluminescence emission from pristine, quasi-1D graphene nanomaterials grown on silicon were undertaken. FIG. 18 illustrates the power-dependent photoluminescence spectra taken on the as-grown sample, where P1 indicated the power with a 66% neutral filter, which yielded 33% of the 20 mW peak power (P2). When the full continuous wave laser power was applied without any neutral density filter, the first signature of a lasing-like peak at 995 nm was observed together with some small peaks at other frequencies. FIG. 18 shows photoluminescence emission spectra taken on one location of an as-grown quasi-1D graphene nanomaterial excited by a continuous wave pump at 532 nm with 20 mW (P2) and 66% (13.2 mW) of the peak power (P1), with spot size of 100 μm diameter, showing a lasing-like peak at 995 nm with 20 mW excitation.

By comparing the intensities of the 995 nm peak with and without the neutral density filter, it was determined that the intensity had increased by a factor of 86, from 0.2 to 17.4. The spectral narrowness of this peak also eliminated the possibility of amplified spontaneous emission (ASE), as such a process would have required a separate gain medium and the resultant photoluminescence emission would have been much broader. The uniqueness of this lasing-like transition was that the photoluminescence emission was mostly suppressed in all other wavelengths, showing a clean single-mode lasing preference. This was a surprising and unexpected observation, and further investigations on other locations of the sample for reproducibility of the 995 nm peak were performed.

Regarding the possibility of this emission being a random lasing event, the suppression of light from the rest of the spatial wavelengths indicates a more fundamental lasing mechanism that may be deduced from collective polaritonic excitations from a regional potential trap being stimulated to the ground state, even if this amplified emission may be associated with some local multiple scattering of light. The existence of a broad distribution of metastable energy levels from defects and the strong quasiparticle-quasiparticle interaction may account for this coherent emission peak.

Figure 19:
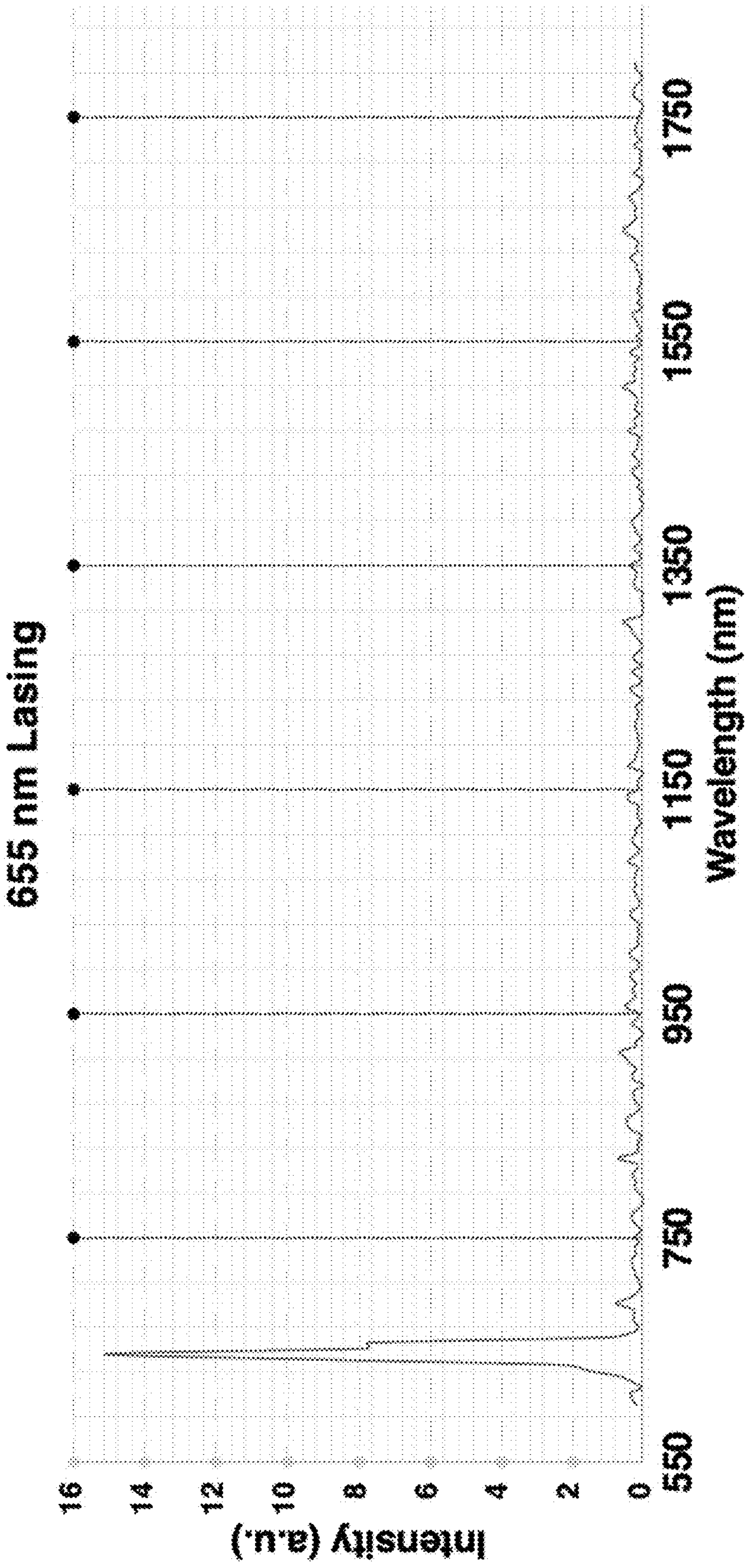
FIG. 19 provides data showing a photoluminescence emission spectrum taken on a second location of the same as-grown quasi-1D graphene sample as in FIG. 18 and under power $P_2$.

Similar to previous observations, another single-mode lasing peak was observed at 655 nm in a different location of the sample (see FIG. 19), this time almost in the visible spectra, which was not seen before using the confocal microscope arrangement with the LSM 880. FIG. 19 shows a photoluminescence emission spectrum taken on a second location of the same as-grown quasi-1D graphene nanomaterial as in FIG. 18, excited by a continuous wave pump at 532 nm with 20 mW, with a spot size of 100 μm diameter. The spectrum shows a lasing-like peak at 655 nm.

Figure 20:
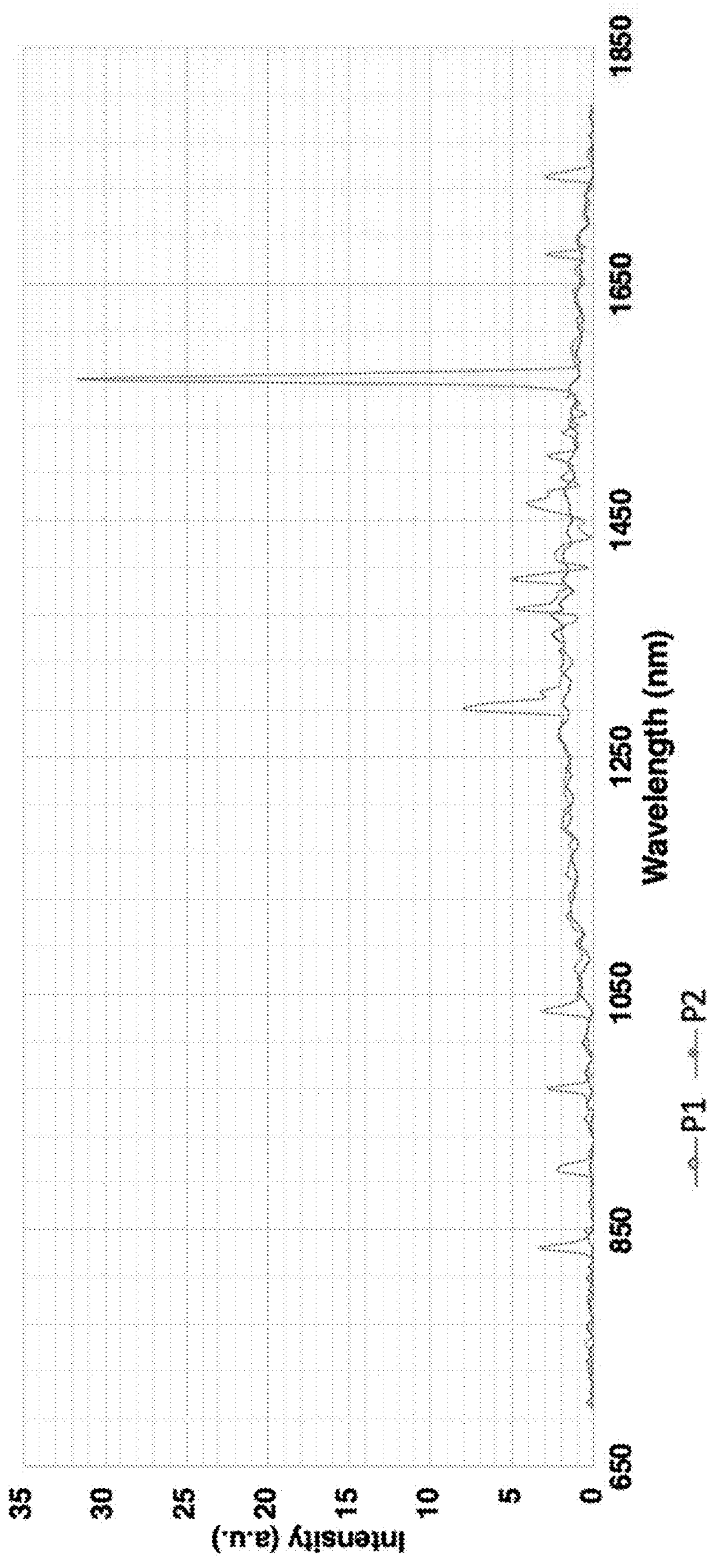
FIG. 20 provides data showing a photoluminescence emission spectrum taken on a third location of the same as-grown quasi-1D graphene sample as in FIG. 18 under powers $P_1$ and $P_2$ (where $P_1<P_2$).

In order to better understand the light-matter interaction in this material, the continuous wave laser was used at 532 nm to excite various parts of the sample. In another arbitrary location on the pristine, quasi-1D graphene, a strong lasing peak was found at 1570 nm with a few other amplifying peaks at many other wavelengths, as shown in FIG. 20, which provides photoluminescence emission spectra taken on a third spot of the same as-grown quasi-1D graphene nanomaterial as in FIGS. 18 and 19, excited by a continuous wave laser at 532 nm with 20 mW (P2) and 66% (13.2 mW) peak power (P1), with spot size of 100 μm diameter. A lasing-like peak at 1570 nm and several other small peaks are apparent for the spectrum taken at P2.

The appearance of other peaks indicates there is a possibility of lasing at multiple wavelengths. The geometry of the quasi-1D graphene nanomaterial being interconnected at many locations during the PECVD synthesis may be considered as a network of coupled resonators where different defects are distributed randomly (in the case of Type-1 defects) or selectively induced throughout the material.

Figure 21:
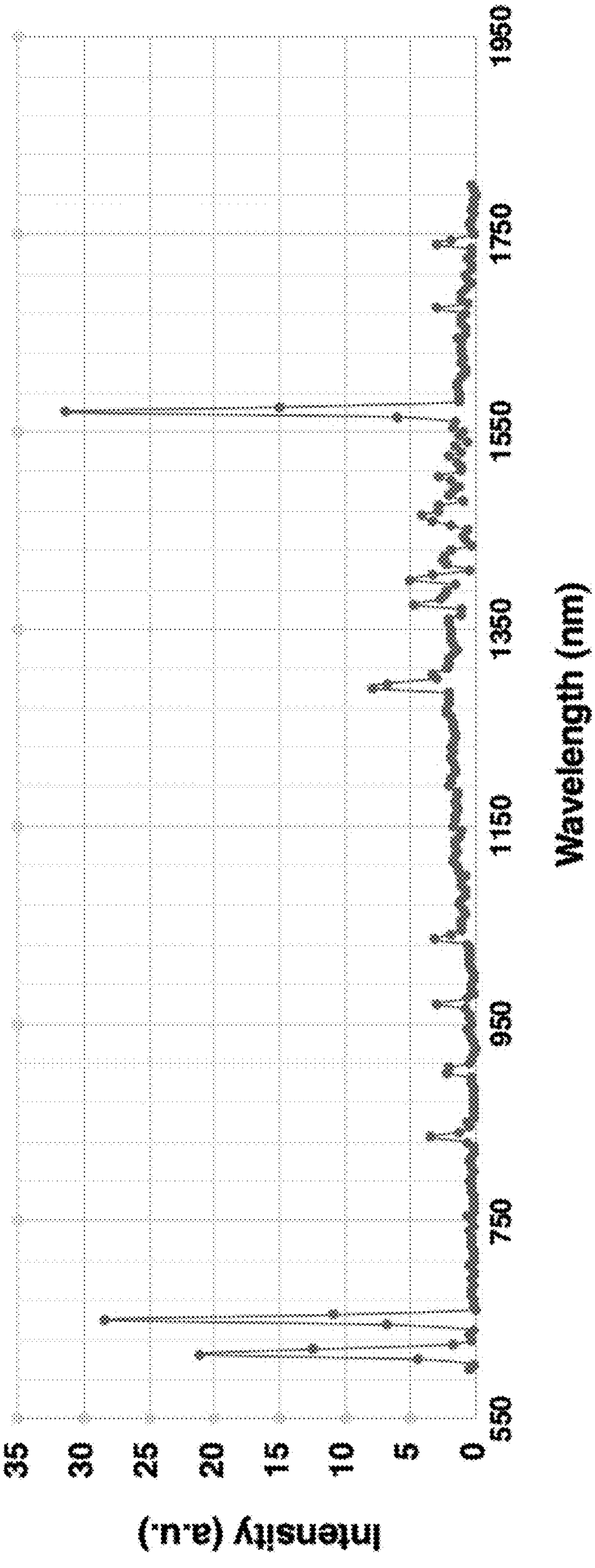
FIG. 21 provides data showing a photoluminescence emission spectrum taken on a third location of the same as-grown quasi-1D graphene sample as in FIG. 18 under power $P_2$.

The photoluminescence emission spectrum in FIG. 21, taken at another different location of the same sample as for FIGS. 18-20, revealed a departure from a single mode emission to a multi-mode emission. FIG. 21 provides a photoluminescence emission spectrum from a fourth area of the same as-grown graphene sample, showing multi-mode emission from 615 nm, 650 nm, and 1570 nm with continuous wave 532 nm excitation at 20 mW.

With many other peaks emerging with some amplified peaks, the lasing phenomena exhibited a mode distribution, and thus indicated the availability of various cavity modes within the 100 μm spot. The measurements being done at room temperature, where the photoluminescence intensity was expected to be the highest based on temperature-dependent studies shown in FIG. 14, also indicate that these nanomaterials are useful candidates for high temperature lasing, which is in contrast to most conventional lasers requiring cryogenic cooling. The observed signatures of lasing thus confirm that quasi-1D graphene nanomaterials are useful for creating collective excited states that can be amplified through strongly confined and coherent light-matter interactions.

Figure 22:
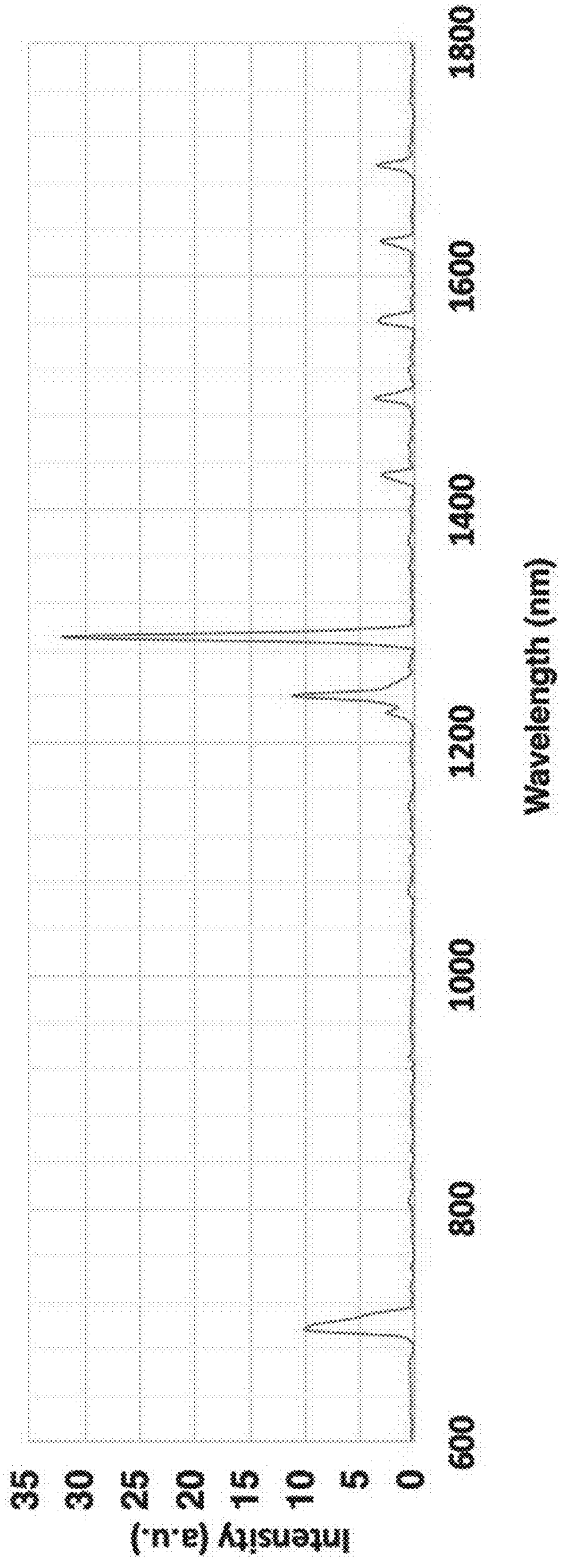
FIG. 22 provides data showing a photoluminescence emission spectrum taken on a fourth location of the same as-grown quasi-1D graphene sample as in FIG. 18 under power $P_2$.

Lastly, another signature of nonlinear optical processes was observed while pumping a different part of the sample, when a lasing peak was identified at 1290 nm as well as some signature of a damped optical comb like emissions, as shown in FIG. 22, which provides a photoluminescence emission spectrum from a fifth area of the same as-grown graphene sample with continuous wave pump at 532 nm, 15 mW peak power, and laser spot size of 100 μm diameter. The spectrum shows a dominant lasing-like peak at 1290 nm as well as periodic, comb-like peaks at 1430 nm, 1495 nm, 1565 nm, 1630 nm, and 1695 nm.

The spectrum shown in FIG. 22 is the first observation of nearly periodic photoluminescence emission peaks, with peak positions at 1430 nm, 1495 nm, 1565 nm, 1630 nm, and 1695 nm and the intensities well above the noise floor, indicating the possibility of weak optical frequency comb, or multimode lasing. Next, this nonlinearity was further investigated to examine the features of Kerr effects in graphene as a plausible pathway to create multiple coherent emission lines.

Figure 23A:
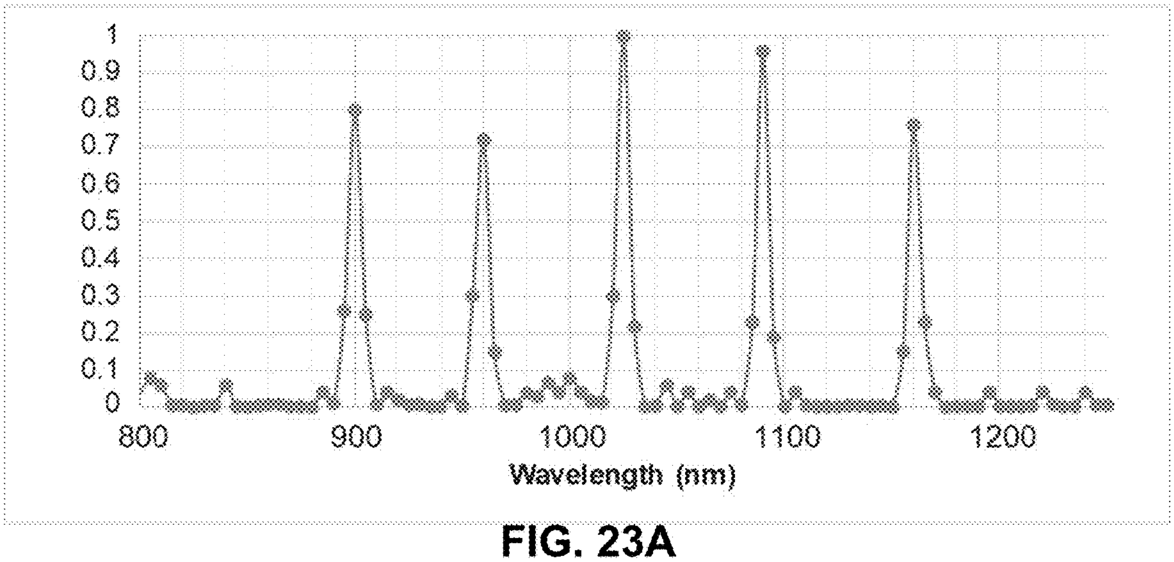
FIG. 23A provides data showing a photoluminescence emission spectrum taken on a quasi-1D graphene sample according to some embodiments.
Figure 23B:
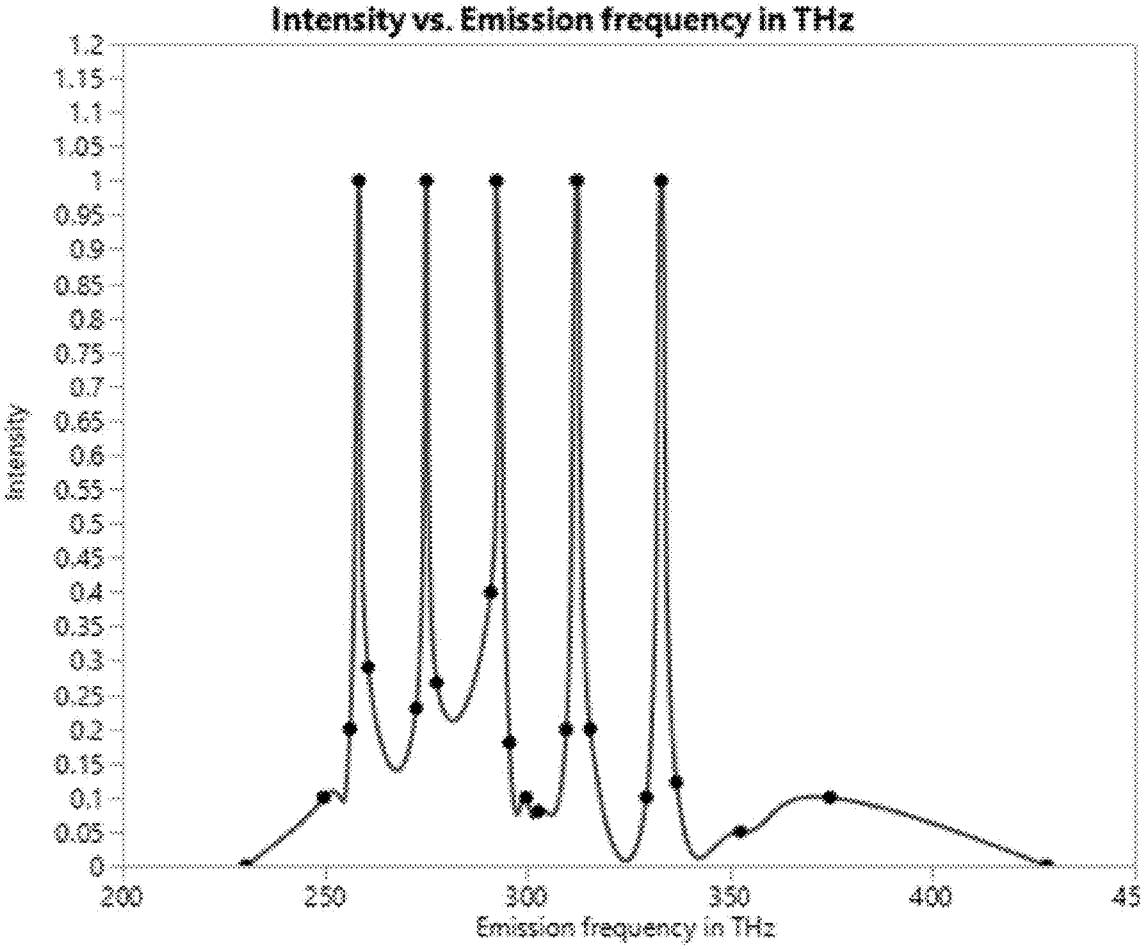
FIG. 23B shows the emission spectrum from FIG. 23A converted to the frequency domain.

In addition to the periodic, comb-likes peaks shown in FIG. 22, similar behavior was found in another area of the sample, which revealed emission peaks at 900 nm, 960 nm, 1025 nm, 1090 nm and 1160 nm, as shown in FIG. 23A. Converting these emission wavelengths to emission frequencies (FIG. 23B), we found that the frequency interval between two consecutive modes, which is known as the free spectral range (FSR), was about 21 THz on average for modes between 333 THz (900 nm) and 312 THz (960 nm). For a closed path resonator, the $FSR=c/(n_g \cdot L)$ where $n_g$ is the group velocity refractive index at the wavelength of the sideband, L is the length of the resonator perimeter, and c is the speed of light. Without wishing to be bound by any theory, the mechanism for such an optical comb may be understood from a combination of Kerr nonlinearity and polariton interaction leading to spontaneous pattern formation in other strongly interacting excitonic systems, such as non-equilibrium Bose-Einstein Condensates or Polariton Condensates.

For an ideal multimode laser with FSR~21 THz and N=6, the time domain pulse width is obtained by computing the Fourier transform as ~7 fs (computed as 1/N*FSR=1/6*21 THz) and pulse duration (1/FSR=1/21 THz) as 0.05 ps or 50 fs.

CMOS-Compatible Deposition of Graphene Nanomaterial on Arbitrary Substrates

This disclosure provides graphene and 2D material-based technologies that employ CMOS compatible transfer of 2D material from their original growth substrate (like copper or nickel) onto any arbitrary CMOS surface. In some examples, solvent assisted exfoliation and optical lithography-based patterning are used for 2D material deposition using a low-vacuum (e.g., less than 50 mTorr) serial evaporation sequence to control thickness and film quality.

A major challenge for integration of graphene with current CMOS infrastructure is the lack of an industrial scale production of graphene with high yield (greater than 1000 mg of pristine graphene in less than 60 minutes). Roll-to-roll processing has been used to transfer graphene, which is generally synthesized on copper using a CVD-based technique. This method generally lacks good control over grain boundaries, resulting in multi-domain and/or multi-layer graphene sheets being transferred.

Another major challenge involving the transfer of graphene from copper foil or nickel foil to any arbitrary surfaces is the lack of compatible CMOS processing steps. The use of polymer-assisted or polymer-free transfer tends to have limitations: a residue can be left on the surface, and residual polymer removal can require multiple post-processing steps, which severely affects the electronic and optical properties of pristine graphene.

Figure 24:
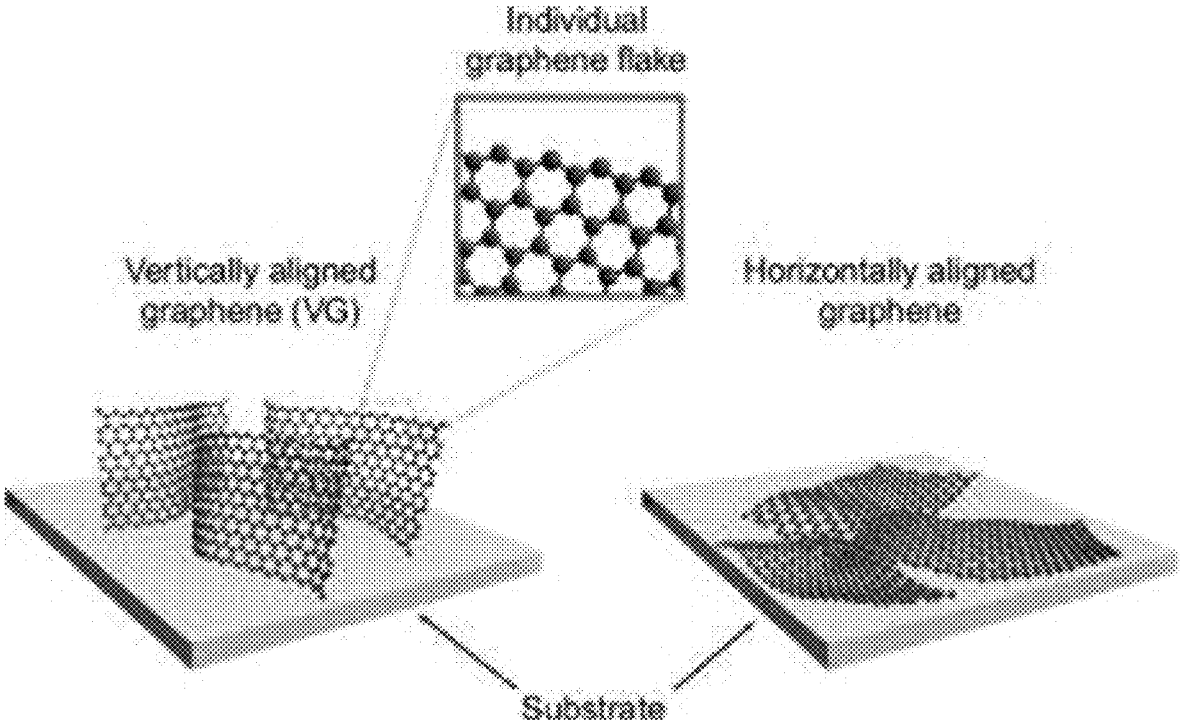
FIG. 24 provides a schematic illustration comparing vertically aligned graphene with horizontally aligned graphene.
Figure 25:
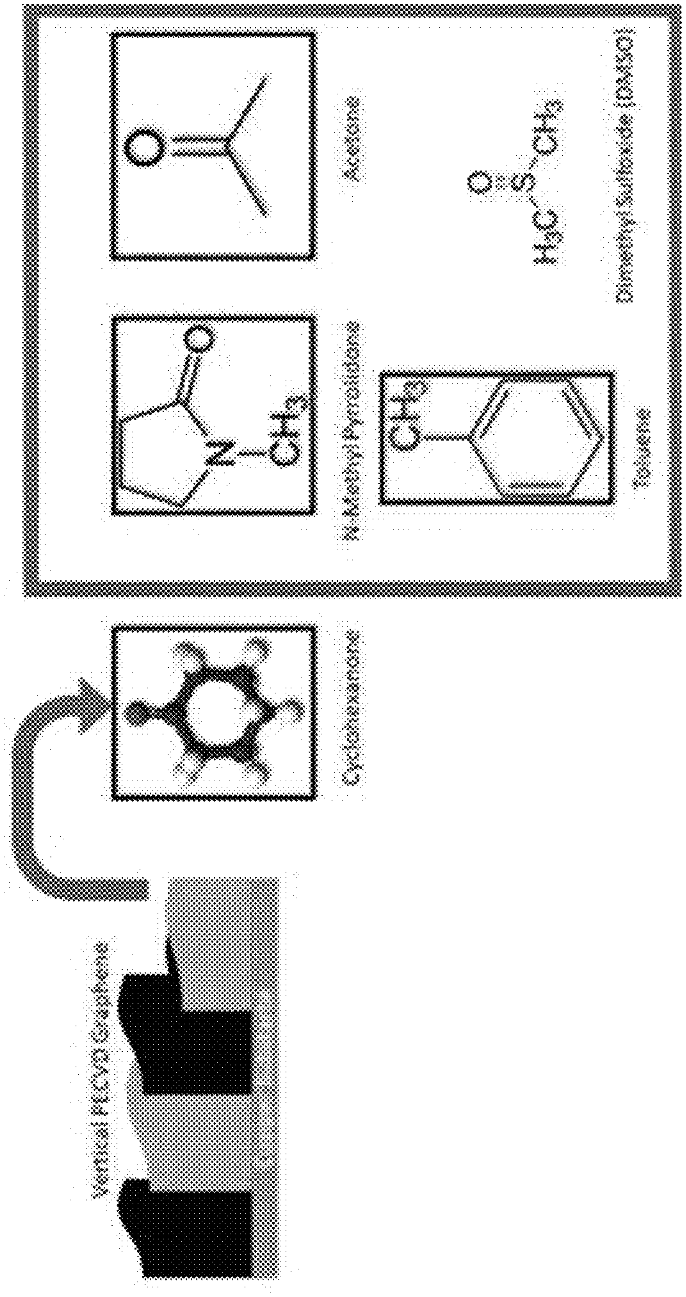
FIG. 25 provides a schematic illustration of vertical PECVD graphene with structures of various solvents.
Figure 26:
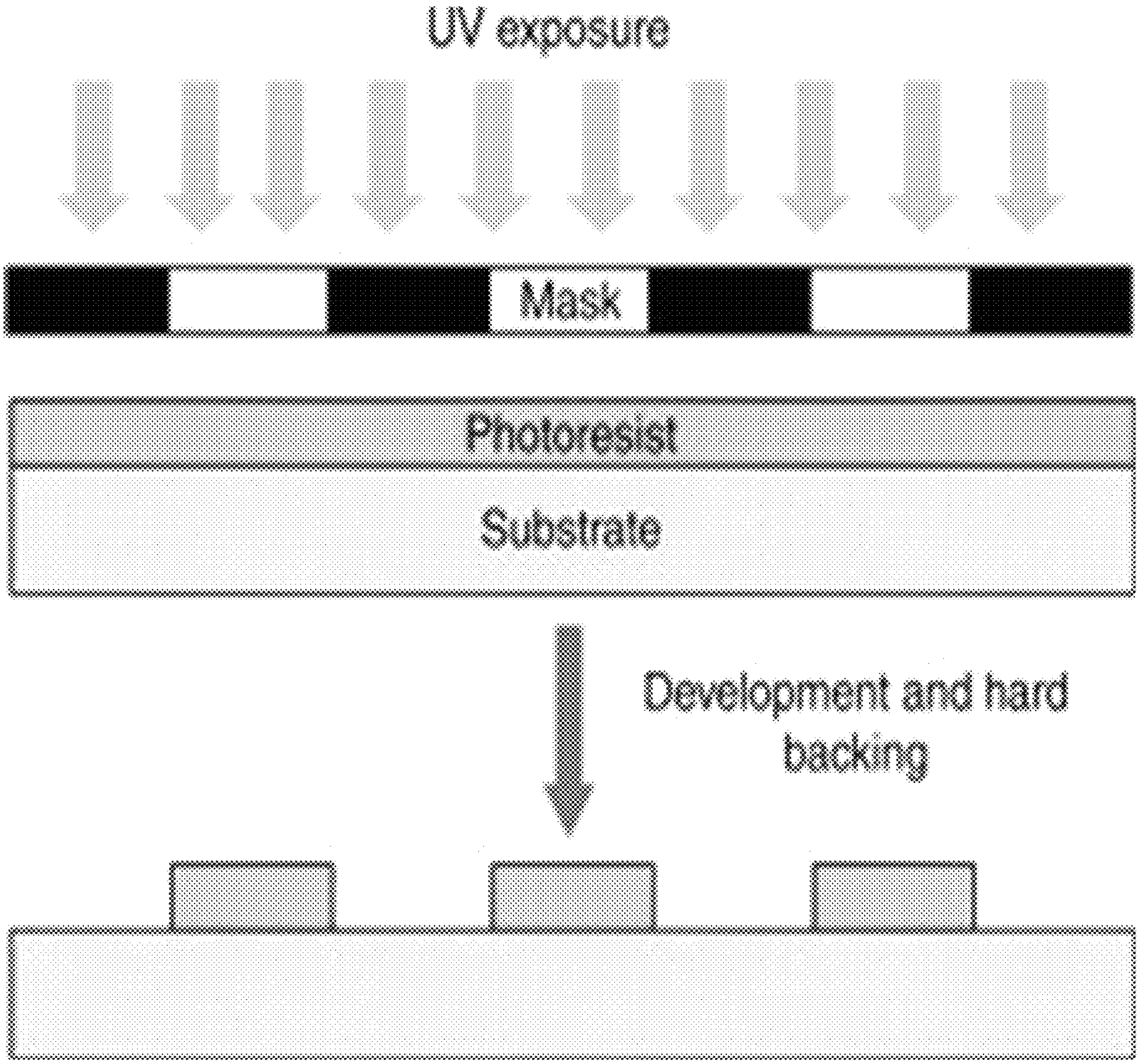
FIG. 26 shows a schematic of a CMOS process for defining the deposition region by optical lithography patterning.

This disclosure provides a method for liquid exfoliation of vertically aligned or grown graphene nanomaterial based on sonication that allows for generating a colloidal suspension of graphene nanoflakes, ranging from new nanometers to several microns, in a cyclohexanone solvent. FIG. 24 provides a schematic illustration comparing vertically aligned graphene with horizontally aligned graphene. For example, the vertically aligned graphene nanomaterial can be grown on a copper substrate using a plasma-enhanced chemical vapor deposition (PECVD) process, and then sonicated in a solvent (e.g., cyclohexanone) for up to 30 minutes, or longer, depending on the application, to exfoliate the graphene so that it can be deposited elsewhere by placing drops of the solvent/graphene mixture on a surface. FIG. 25 provides a schematic illustration of vertical PECVD graphene with structures of various solvents. The stability of the graphene-cyclohexanone mixture is found to be better than N-methyl pyrolidone (NMP) for solution-processing techniques. This graphene mixture in a solvent is then transferred to any substrate of interest, optionally by first patterning the substrate, such as with PMMA or another polymer resist, to have side-walls of 100 micron height or above. FIG. 26 shows a schematic of a CMOS process for defining the deposition region by optical lithography patterning. This allows for the graphene material to be drop-coated inside the lithographically patterned region using a micro-pipette robot that can dispense volumes as small as 10 μL to 100 μL. Although patterning using photoresists is depicted, other hardmasks, such as comprising alumina, can reduce or limit damage, sputtering, or carbonization that can occur in the photoresist during deposition of the graphene.

Figure 27:
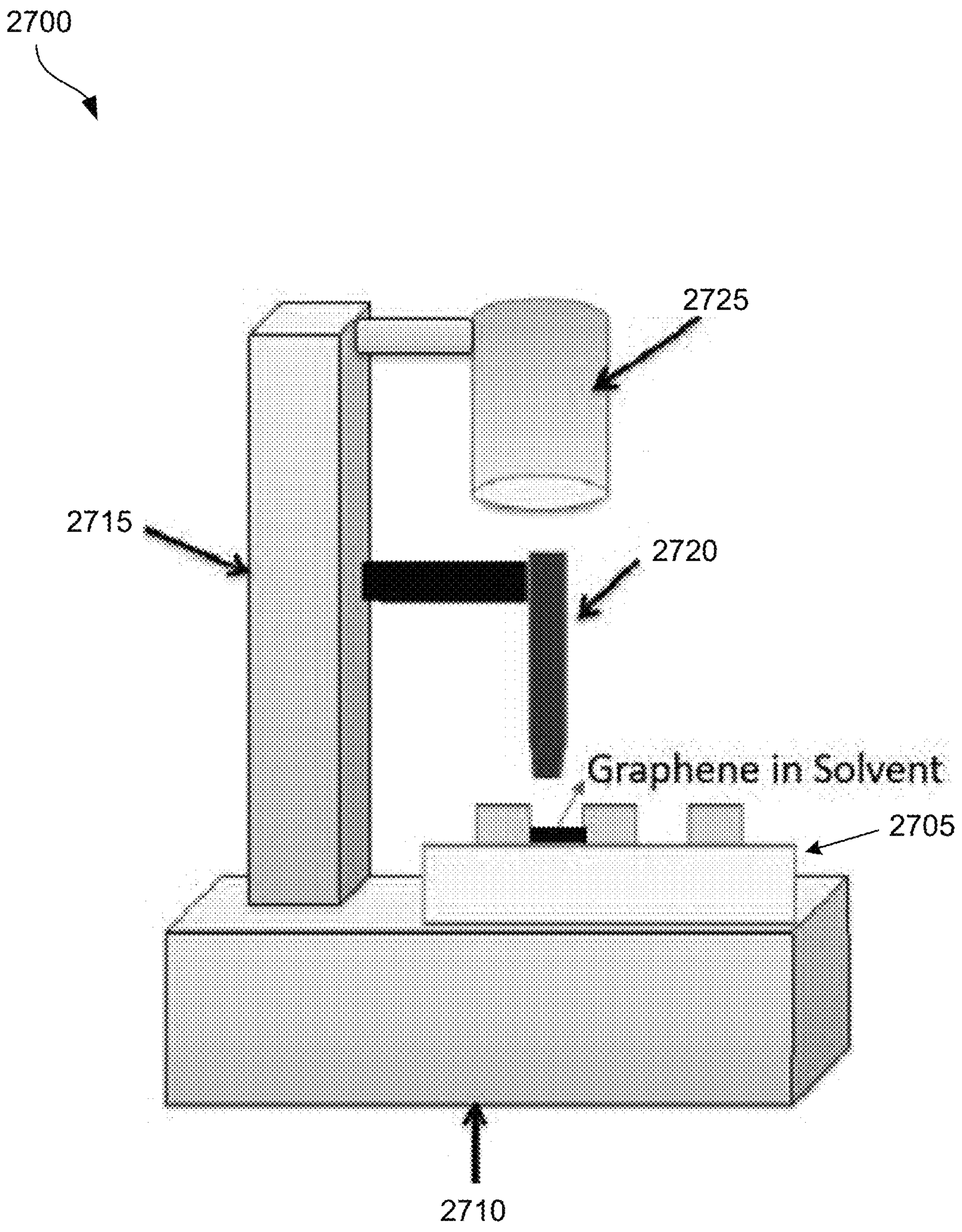
FIG. 27 shows a schematic of liquid drop coating of graphene nanomaterial in a solvent on the lithographically patterned region of interest.

FIG. 27 shows a schematic of a system 2700 for liquid drop coating of graphene nanomaterial in a solvent on a substrate 2705, such as a lithographically patterned region of interest. Without limitation, other suitable solvents can be used in place of cyclohexanone. As illustrated, an XY-micropositioner 2710 and Z-micropositioner 2715 are used to control the relative position between a micropipette 2720 containing the graphene/solvent mixture and the substrate 2705. A microscope 2725 can be used to ensure proper placement of drops from the micropipette 2720 on the surface of the substrate 2705, such as in the lithographically patterned region of interest.

Figure 28:
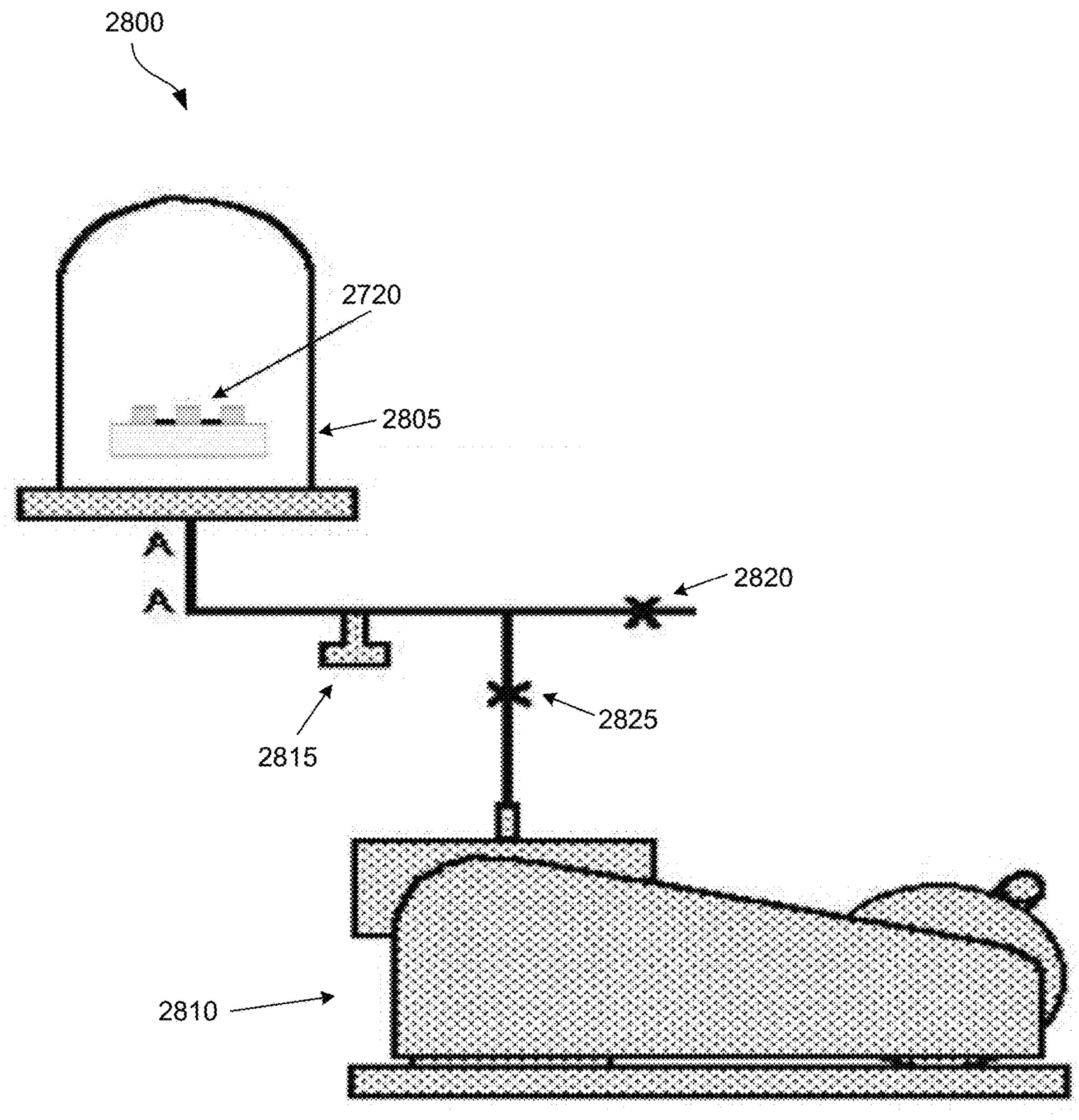
FIG. 28 provides a schematic illustration of vacuum evaporation of the solvent in a vacuum chamber.

The substrate 2705 can then be placed inside a room-temperature vacuum chamber with less than 100 mTorr pressure, optionally without any active heating. In some examples, cyclohexanone from a graphene suspension in cyclohexanone can be rapidly evaporated (e.g., in under 15 minutes), which can prevent the graphene from aggregating at the edges (usually the case under ambient atmospheric pressure-based vaporization of organic solvents). FIG. 28 provides a schematic illustration of a system 2800 for vacuum evaporation of the solvent in a vacuum chamber 2805 (e.g., using a bell jar or other configuration), where a vacuum pump 2810 is used for evacuating the vacuum chamber 2805. FIG. 28 also shows a rough vacuum gauge 2815 for visualization of the vacuum pressure, a vent valve 2820 for venting of the vacuum chamber 2805, and an isolation valve 2825 to isolate the vacuum pump 2810. This low-pressure assisted rapid evaporation has shown good deposition results for transferring vertically grown graphene using PECVD process on copper foil to a CMOS chip. After each 10 μL or 100 μL graphene-in-cyclohexanone dispensed followed by vacuum drying, the steps can be repeated for obtaining the desired thickness of the graphene film. Without limitation, vacuum evaporation with or without heating can be used.

Figure 29A:
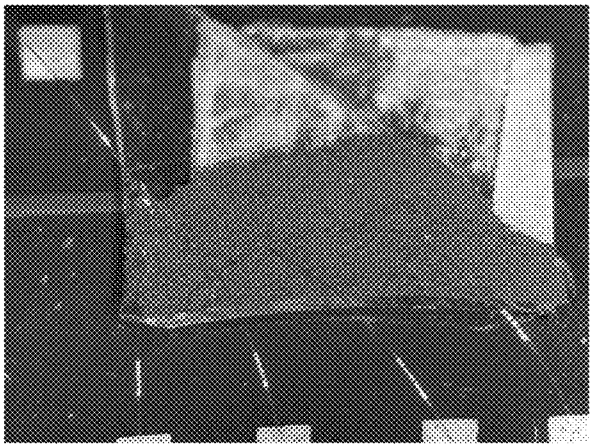
FIG. 29A shows an image of a layer of vertical graphene nanomaterials deposited on a quartz substrate.

1 mg of quasi-1D graphene in the form of a thin film was prepared using such a technique, where 1 mL of a graphene-in-cyclohexanone mixture was drop coated using 10 steps of 100 μL each, followed by vacuum evaporation of the cyclohexanone at each step. FIG. 29A shows an image of the graphene sheet deposited on a quartz substrate.

The resultant 50 μm thick graphene film was evaluated using 4-probe Kelvin characterization to determine the final sheet resistance of the film. A result of 9 kΩ/square was observed, which coincides with the literature value for sheet resistance of pristine graphene on silicon oxide surface. Thus, this method of depositing graphene has the double advantage of low sheet resistance and the ability to pattern arbitrary areas on arbitrary CMOS surfaces.

Figure 29B:
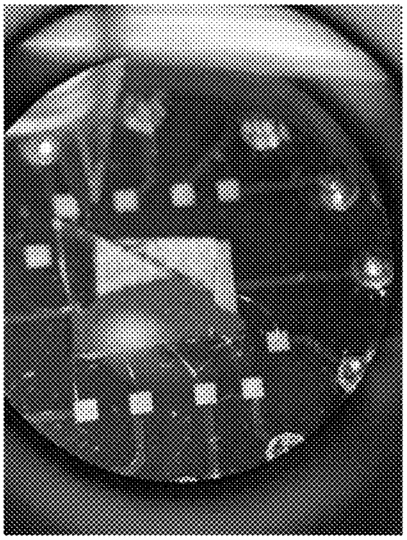
FIG. 29B shows an image of a wire bonded graphene sheet on quartz.
Figure 30:
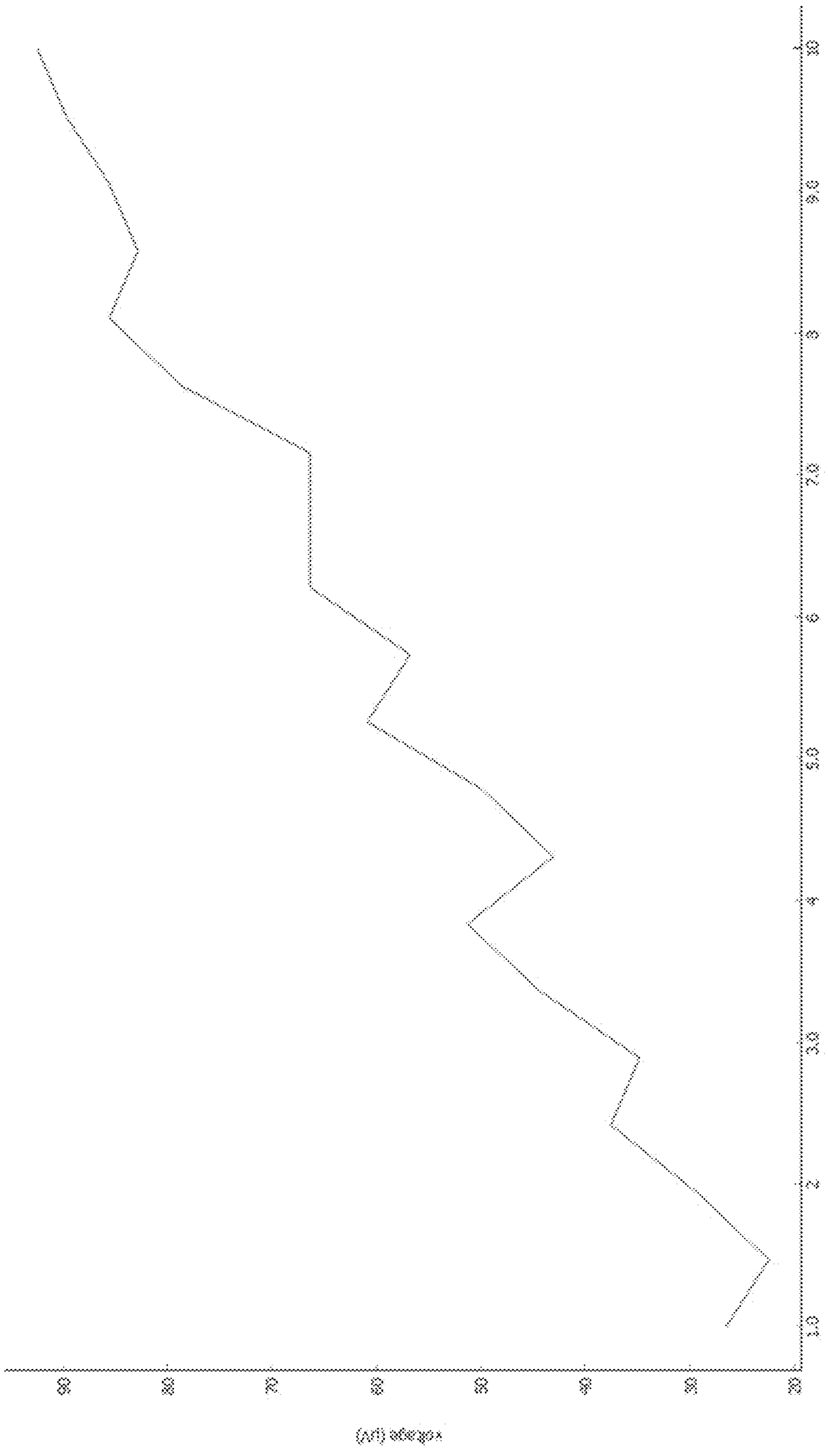
FIG. 30 shows results of a 4-probe resistance measurement of the graphene sheet under dark conditions at room temperature.

This method of deposition also allows for graphene thin layers to be directly wire bonded without the need for additional metallization layers on top or bottom of the graphene layer. This provides an advantage for material integration. FIG. 29B shows an image of the wire bonded graphene sheet on quartz for physical property measurements. FIG. 30 shows results of a 4-probe resistance measurement of the graphene sheet under dark conditions at room temperature.

The use of ultrasonic energy and drop coating allows for formation of a “mesh” of multiple graphene nano- and micro-scale flakes, which in turn allows the wire bond to be embedded strongly in the mesh to ensure a strong ohmic bond with low contact resistance is formed. A poor wire bond may be caused due to use of excess wire bonding power that may cause the wire bond to be loose and thus increase the contact resistance to several GΩ if the wire bonding is not done carefully.

This deposition technique provides for the ability to integrate graphene into a variety of hybrid devices for numerous applications including, but not limited to, medical and chemical sensing, electrical inter-connect technologies, optoelectronic device integration, photovoltaic hybrid devices, neuronal recording applications, neuronal stimulation applications, graphene based hybrid magnetic memory devices, graphene photonic devices, graphene-on-silicon hybrid device, graphene lithium ion batteries, super capacitors, etc. This process can also be scaled up for larger samples. For example, scotch tape can be used to build side walls for depositing the graphene-in-solvent mixture in between the well created. Then the devices can be dried under vacuum and this step can be repeated in series.

Graphene-on-Silicon Photonic Based Hybrid Optical Devices

Although Silicon Photonics (SiP) based optical interconnects have largely met the demands of data communication in the last 10 years, SiP technologies suffer from a large footprint and high power consumption due to negligible electro-optic Kerr coefficient ($\sim 6\times10^{-18}$ $m^2$ $W^{-1}$) and high insertion losses in SiP that need to be addressed for intra-chip communication.

Graphene, despite winning the 2010 Nobel Prize, was unable to meet the industrial requirements of optical interconnects due to the graphene-synthesis methods being non-scalable and also graphene deposition on arbitrary surfaces being non-CMOS-compatible. This disclosure, however, provides for “Graphene-on-Silicon” (GOS) photonic hybrid optical interconnect technologies.

For example, vertically grown, quasi one-dimensional (1D) graphene nanostripes (GNSPs) can be grown by plasma enhanced chemical vapor deposition (PECVD), which can allow large amounts of graphene to be grown on a copper substrate (e.g., up to 2,100 mg/$cm^2$) in under 60 minutes with a single-step process. The PECVD process can also be used to directly grow either multilayer graphene sheets or GNSPs on silicon substrates with full coverage, which enables versatile integration to CMOS. The above example further describes a technique to transfer and deposit thin layers (e.g., a thickness from 50 nm to 100 μm) of GNSPs onto arbitrary substrates by optical lithography patterning and vacuum deposition of liquid exfoliated graphene.

These techniques allow for completely “CMOS compatible” hybrid optical interconnects that can now exploit the unique properties of graphene such as: very high electron mobility, high modulation depth, large Kerr coefficient ($\sim 10^{10}$ to $10^{13}$ $m^2$ $W^{-1}$), low heat dissipation at GHz operation speeds, ultrafast photodetection, electrostatic gate-tunable broadband absorption (e.g., due to Pauli Blocking effect) and the observation of novel broadband photoluminescence under ambient conditions from PECVD-grown GNSPs.

Figure 31A:
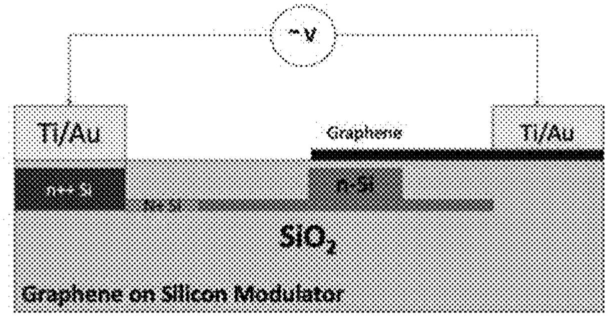
FIG. 31A shows a schematic of an example graphene-on-silicon electro-absorption modulator (EAM).
Figure 31B:
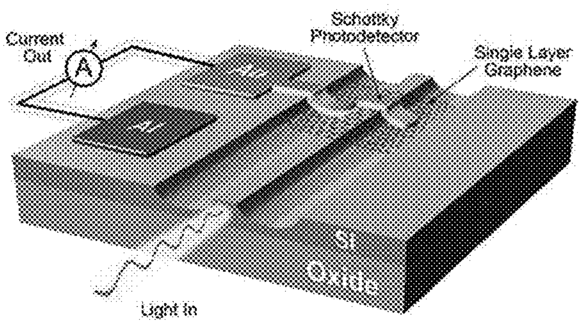
FIG. 31B shows a schematic of an example graphene-on-silicon Schottky photodetector.
Figure 31C:
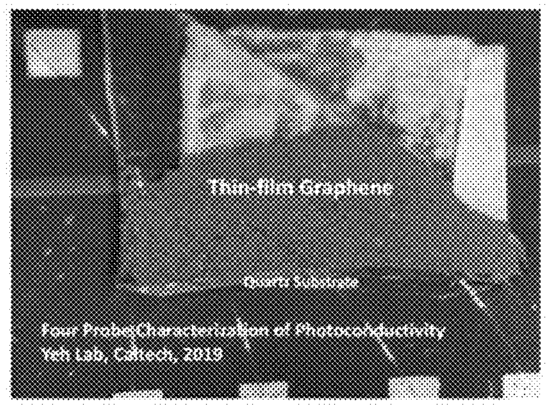
FIG. 31C shows an example of a graphene thin film on a quartz substrate for use as a photodetector.
Figure 31D:
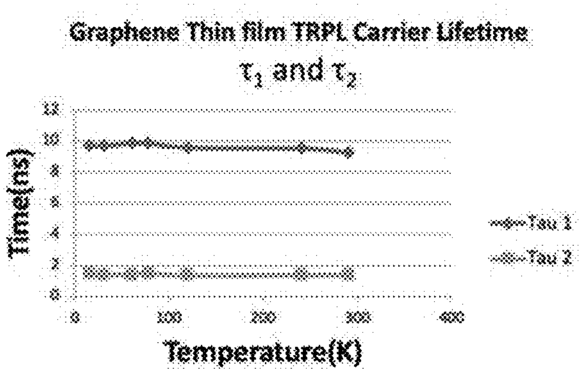
FIG. 31D shows an example of time-resolved photoluminescence carrier lifetimes of graphene thin-films as a function of temperature.
Figure 31E:
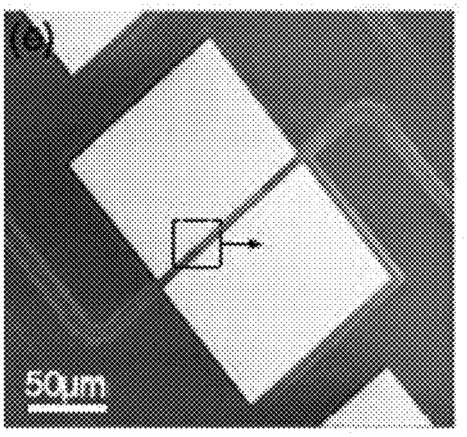
FIG. 31E shows another example graphene-on-silicon electro-absorption modulator.
Figure 31F:
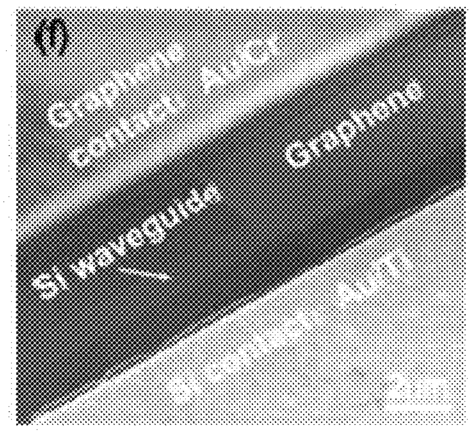
FIG. 31F shows another example graphene-on-silicon electro-absorption modulator.

FIG. 31A shows a schematic of an example graphene-on-silicon electro-absorption modulator (EAM). FIG. 31B shows a schematic of an example graphene-on-silicon Schottky photodetector. FIG. 31C shows an example of a graphene thin film on a quartz substrate for use as a photodetector. FIG. 31D shows an example of time-resolved photoluminescence carrier lifetimes of graphene thin-films as a function of temperature. FIG. 31E and FIG. 31F show another example graphene-on-silicon electro-absorption modulator.

Preliminary electrical characterization of a 50 μm layer of graphene shows a resistance of 10 kΩ, which is reduced to 9 kΩ under room temperature illumination with 365 nm (power density <2 mW/$cm^2$) due to increased photoconductivity (10% drop in resistance due to excess photocarriers). A time-resolved photoluminescence study when excited by 355 nm pulsed laser showed 10 ns carrier relaxation times, i.e., emission lifetimes, which are 1000 times longer than any known carrier relaxation times in other graphene-based materials, allowing for several GHz operation speed of thin layers of GNSPs independent of temperature and thickness, owing to the strong electron-electron correlations (due to the quasi-1D nanostructures) and strong light-matter interactions (due to extensive sub-wavelength scattering in the nanostructures) of the PECVD-grown GNSPs. This shows stronger light-matter interaction in thin-layer of GNSP than single layer graphene, which allows for a higher modulation index over a smaller area, higher operation speed, and lower power consumption. The ability to directly grow graphene on Si waveguides for photodetectors is a powerful step towards graphene integration. Combination When this is combined with the technique to deposit graphene using lithography, this enables the realization of next generation electro-absorption modulators, where the applied electric field modulates the Fermi level in graphene which changes the optical absorption of light from the Si waveguide due to strong evanescent coupling.

Figure 32:
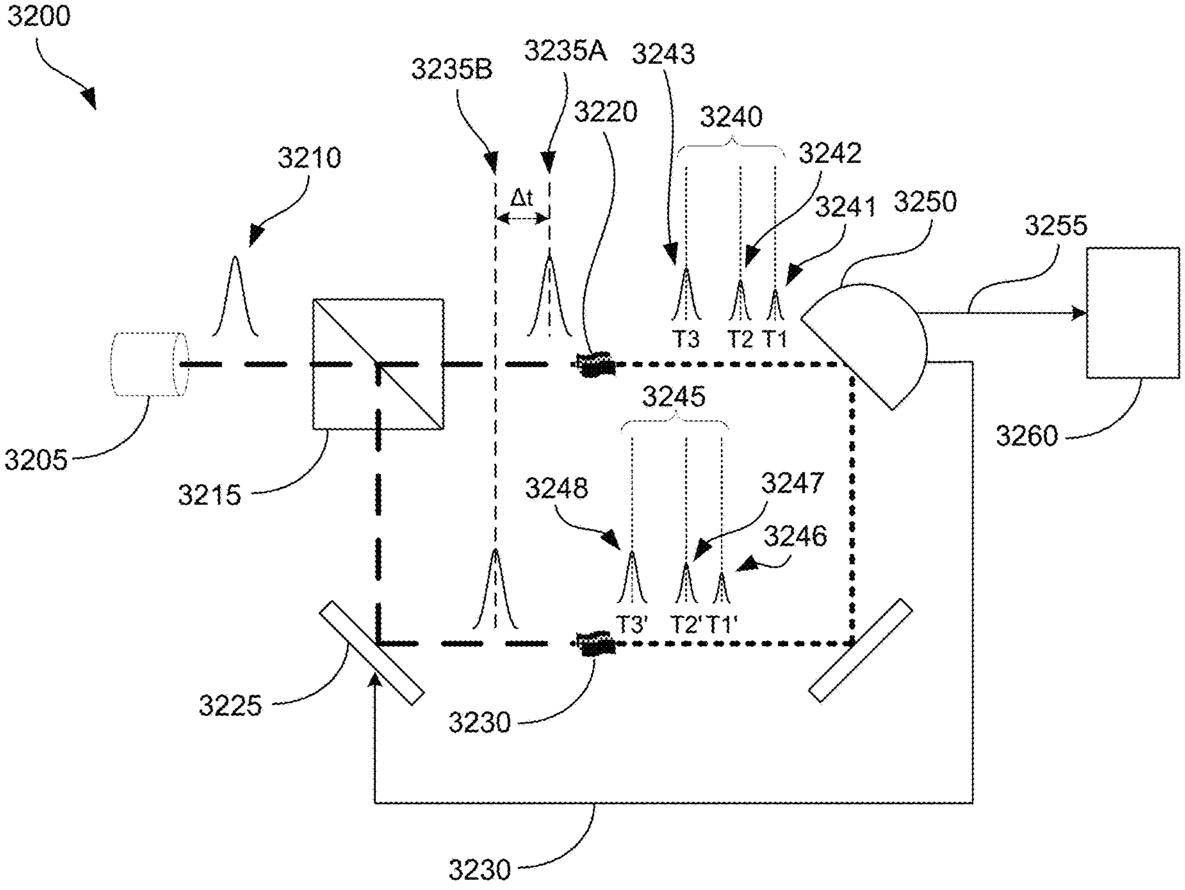
FIG. 32 shows a schematic illustration of an optical switch configuration using optically active graphene according to some embodiments.

FIG. 32 provides a schematic illustration of an example of an optical device 3200 comprising optically active graphene, which can be useful as an optical switch. Optical device 3200 includes a pump source 3205 outputting pulses 3210 of light. The light from the pump source 3205 is directed to a beamsplitter 3215, which splits the light in two directions. Light travelling along a first direction is directed toward a first optically active graphene sample 3220. Light travelling along a second direction is directed toward a delay stage 3225 (e.g., one or more movable mirrors) and then toward a second optically active graphene sample 3230. As illustrated, light pulses 3235A and 3235B reaching first optically active graphene sample 3220 and second optically active graphene sample 3230 have a delay between them, due to delay stage 3225.

Upon stimulation by light pulse 3235A, first optically active graphene sample 3220 generates a series of output photoluminescent pulses 3240 (e.g., 3 pulses 3241, 3242, and 3243, as illustrated). Similarly, upon stimulation by light pulse 3235B, second optically active graphene sample 3230 generates a series of output photoluminescent pulses 3245 (e.g., 3 pulses 3246, 3247, and 3248, as illustrated). In examples, the first pulses 3241 and 3246 of output photoluminescent pulses 3240 and 3245 may have a characteristic output time T1 and T1', which may be relatively prompt after receipt of the light pulses 3235A and 3235B at optically active graphene sample 3220 and second optically active graphene sample 3230, such as in less than 1 ns; the second pulses 3242 and 3247 of output photoluminescent pulses 3240 and 3245 may have a characteristic output time T2 and T2', which may be a bit longer after receipt of the light pulses 3235A and 3235B at optically active graphene sample 3220 and second optically active graphene sample 3230, such as about 1-2 ns after receipt; the third pulses 3243 and 3248 of output photoluminescent pulses 3240 and 3245 may have a characteristic output time T3 and T3', which may be even longer after receipt of the light pulses 3235A and 3235B at optically active graphene sample 3220 and second optically active graphene sample 3230, such as about 10 ns after receipt. In some examples, the characteristic output times T1, T1', T2, T2', T3, and T3' may be comparable to the photoluminescence emission lifetimes characteristic of optically active quasi-1D graphene described above, such as with respect to FIGS. 6A-7C.

Output photoluminescent pulses 3245 are shown delayed relative to output photoluminescent pulses 3240 by the time delay, Δt, between light pulses 3235A and 3235B such that characteristic output times of output photoluminescent pulses 3240 and 3245 are spaced by Δt (e.g., T1'=T1+Δt, T2'=T2+Δt, T3'=T3+Δt). Output photoluminescent pulses 3240 and 3245 are directed to a photodetector 3250 (e.g., a synchronous photodetector) that outputs a signal 3255, which is directed to another component 3260, such as a logic gate. The detection of output photoluminescent pulses 3240 and 3245 at photodetector 3250 can indicate if any of the output photoluminescent pulses 3240 align in time with the output photoluminescent pulses 3245.

As illustrated, the second pulse 3247 of output photoluminescent pulses 3245 overlaps with the third pulse 3243 of output photoluminescent pulses 3240 (e.g., T2'=T3). In such a case, the photodetector can output a signal characteristic of the different intensities output photoluminescent pulses 3240 and 3245, but one signal, corresponding to the overlap of the second pulse 3247 of output photoluminescent pulses 3245 with the third pulse 3243 of output photoluminescent pulses 3240, will have an intensity higher than those pulses would give independently (e.g., equal to a sum of intensities of each of those pulses independently). Specifically, the photodetector may output a first signal characteristic of the intensity of the first pulse 3241 of output photoluminescent pulses 3240, a second signal characteristic of the intensity of the second pulse 3242 of output photoluminescent pulses 3240, a third signal characteristic of the intensity of the first pulse 3246 of output photoluminescent pulses 3245, a fourth signal characteristic of the combined intensities of the third pulse 3243 of output photoluminescent pulses 3240 and the second pulse 3247 of output photoluminescent pulses 3245, and a fifth signal characteristic of the intensity of the third pulse 3248 of output photoluminescent pulses 3245. In some cases, the time differences between the different pulses of output photoluminescent pulses 3240 can be representative of different emission lifetimes of the first optically active graphene sample 3220 and the time differences between the different pulses of output photoluminescent pulses 3245 can be representative of different emission lifetimes of the second optically active graphene sample 3230. For example, the first and second optically active graphene samples 3220 and 3230 may exhibit emission lifetimes of less than 1 ns, about 1 ns, and about 10 ns, such that a delay between a first pulse and second pulse of the output photoluminescent pulses 3240 or 3245 may be less than 1 ns, while a delay between a second pulse and third pulse of the output photoluminescent pulses 3240 or 3245 may be about 9 ns. It will be appreciated that these delays are merely examples and are not intended to be limiting. Further, it will be appreciated that the intensities of output photoluminescent pulses 3240 or 3245 depicted in FIG. 32 are merely examples and are not intended to be limiting.

In some examples, a single optically active graphene sample can be used, such as where the delay stage and/or other optics direct the light from the delay stage towards the first optically active graphene sample 3220. In such a case, the two light pulses 3235A and 3235B will interact with the first optically active graphene sample 3220 at different times to generate a plurality of output pulses.

Such an optical device 3200 can be used for complex encoding of data, for example, or as a simple optical switch. In some examples, the signal 3255 can be directed to one or a plurality of different components 3260, such as different logic gates, with different logic conditions being triggered off a particular intensity detected by the photodetector 3250, such as based off any particular overlap between the different output photoluminescent pulses 3240 and 3245. For triggering a particular intensity, it may be desirable to control the time delay between pulses 3235A and 3235B to ensure the desired output photoluminescent pulses 3240 and 3245 overlap. In some examples, a control signal 3265 is provided between the photodetector 3250 and the delay stage 3225 to control the time delay between further pulses 3235A and 3235B, which can manipulate the time delay between light pulse 3235A and 3235B to align certain pulses of output photoluminescent pulses 3240 and 3245 for triggering a particular logic condition according to a particular pulse overlap and thus intensity detected at photodetector 3250. Optionally, the control signal 3265 originates from component 3260 or another component instead of photodetector 3250.

Advantageously, optical device 3200 can be integrated into an optical circuit and can provide a temperature independent operation, due to the temperature independent emission lifetimes associated with the optically active graphene used therein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A light emitter comprising:

a substrate; and a quasi-1D graphene nanomaterial coupled to the substrate, wherein the quasi-1D graphene nanomaterial consists essentially of carbon and includes one or more topological defects.

2. The light emitter of claim 1 wherein the quasi-1D graphene nanomaterial is characterized by a length, a width, and a thickness of one to several monolayers, wherein a length-to-width ratio is greater than 10:1.

3. The light emitter of claim 2 wherein the length-to-width ratio is between 10:1 and 130:1.

4. The light emitter of claim 1 wherein the quasi-1D graphene nanomaterial is characterized by an emission lifetime on the order of 300 ps to 10 ns.

5. The light emitter of claim 4 wherein the emission lifetime is on the order of 1 ns to 10 ns.

6. The light emitter of claim 1 wherein the quasi-1D graphene nanomaterial consists of carbon.

7. The light emitter of claim 1 wherein the one or more topological defects comprises Stone-Wales defects.

8. The light emitter of claim 1 wherein the one or more topological defects comprises single vacancy defects.

9. The light emitter of claim 1 wherein the one or more topological defects comprises double vacancy defects.

10. The light emitter of claim 1 wherein the quasi-1D graphene nanomaterial comprises less than 100 layers of graphene.

11. The light emitter of claim 1 wherein the quasi-1D graphene nanomaterial is characterized by an emission lifetime that is temperature independent.

12. The light emitter of claim 1 wherein the substrate comprises silicon.

* * * * *